US012609735B2

(12) United States Patent (10) Patent No.: US 12,609,735 B2

Elshafie et al. (45) Date of Patent: Apr. 21, 2026

(54) NETWORK COMMUNICATIONS BETWEEN RECONFIGURABLE INTELLIGENT SURFACES

(71) Applicant: QUALCOMM INCORPORATED, San Diego, CA (US)

(72) Inventors: Ahmed Elshafie, San Diego, CA (US); Yu Zhang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 18/549,133

(22) PCT Filed: Apr. 7, 2021

(86) PCT No.: PCT/CN2021/085793

§ 371 (c)(1),
(2) Date: Sep. 5, 2023

(87) PCT Pub. No.: WO2022/213301

PCT Pub. Date: Oct. 13, 2022

(65) Prior Publication Data

US 2024/0154648 A1 May 9, 2024

(51) Int. Cl.
*H04B 7/04* (2017.01)
*H04B 7/06* (2006.01)
(Continued)

(52) U.S. Cl.
CPC ....... *H04B 7/04026* (2023.05); *H04B 7/0617* (2013.01); *H04W 8/22* (2013.01); *H04W 24/02* (2013.01)

(58) Field of Classification Search
CPC .............. H04B 7/04026; H04B 7/0617; H04B 7/04013; H04B 7/0634; H04B 7/0639;
(Continued)

(56) References Cited

U.S. PATENT DOCUMENTS

2019/0394634 A1    12/2019   Akkarakaran et al.
2023/0246674 A1*    8/2023   Åström .............. H04B 7/04013
                                                            375/262
2023/0308139 A1*    9/2023   Baligh ............... H04B 7/04013

FOREIGN PATENT DOCUMENTS

CN    112383332 A    2/2021
CN    112492512 A    3/2021
(Continued)

OTHER PUBLICATIONS

Supplementary European Search Report—EP21935536—Search Authority—Munich—Nov. 26, 2024.
(Continued)

*Primary Examiner* — Ashley Shivers
(74) *Attorney, Agent, or Firm* — Holland & Hart LLP

(57) ABSTRACT

Methods, systems, and devices for wireless communications are described. Generally, a reconfigurable intelligent surface (RIS) may transmit a capability information message including an indicating that the RIS is capable of participating in network communications and communicating with other RISs on the network. A first RIS may communicate beam information to a second RIS directly, or the first RIS may communicate beam information to the second RIS via a base station, or the first RIS may communicate beam information to the second RIS via a user equipment (UE). In some examples, one RIS may request beam information or reflecting assistance from another RIS.

30 Claims, 21 Drawing Sheets

(51) Int. Cl.
    *H04W 8/22*       (2009.01)
    *H04W 24/02*     (2009.01)

(58) Field of Classification Search
    CPC ..... H04B 7/15528; H04B 7/088; H04W 8/22;
                                     H04W 24/02
    See application file for complete search history.

(56) References Cited

FOREIGN PATENT DOCUMENTS

| WO | WO-2019132083 A1 | 7/2019 |
| WO | WO-2020254030 A1 | 12/2020 |

OTHER PUBLICATIONS

Wu Q., et al., "Intelligent Reflecting Surface-Aided Wireless Communications: A Tutorial", IEEE Transactions on Communications, vol. 69, No. 5, May 2021, pp. 3313-3351, Jan. 18, 2021, XP011855356, p. 1-p. 3, p. 7-p. 15, figures 1-3, 5, 25.

Dong L., et al., "Double Intelligent Reflecting Surface for Secure Transmission With Inter-Surface Signal Reflection", IEEE Transactions On Vehicular Technology, Feb. 25, 2021(Feb. 25, 2021), No. 3 vol. 70 the whole document, pp. 2912-2916.

International Search Report and Written Opinion—PCT/CN2021/085793—ISA/EPO—Jan. 6, 2022.

Zheng B., et al., "Efficient Channel Estimation for Double-IRS Aided Multi-User MIMO System", IEEE Transactions on Communications, Mar. 9, 2021, No. 6, vol. 69, the whole document, pp. 1-15.

\* cited by examiner 605-a          605-b                    605-c                            605-d

| TX RIS ID | RX RIS ID | Beam Information | Device Information |

600

1110        1120        1115

1105

1100

Figure 19:
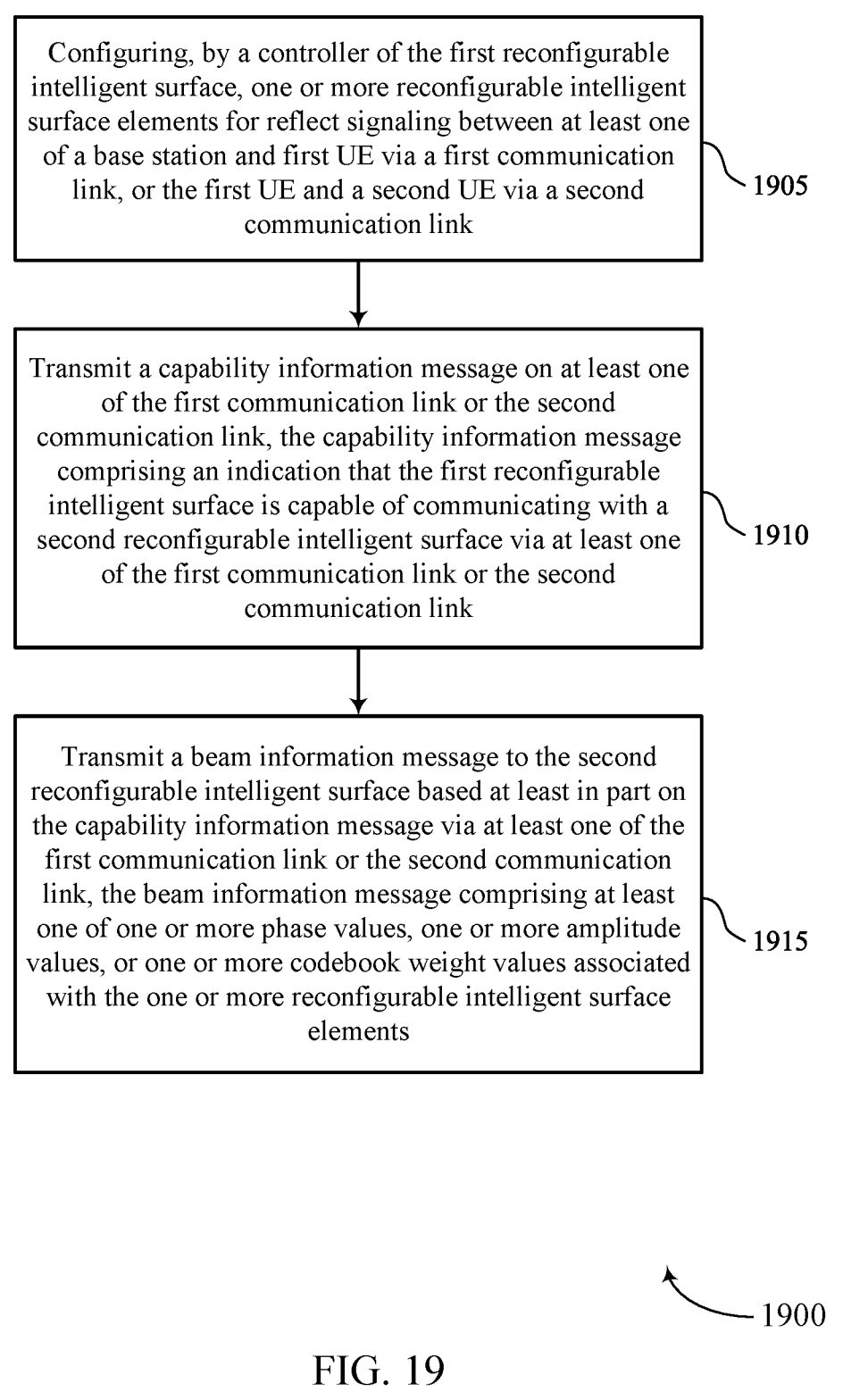

Configuring, by a controller of the first reconfigurable intelligent surface, one or more reconfigurable intelligent surface elements for reflect signaling between at least one of a base station and first UE via a first communication link, or the first UE and a second UE via a second communication link

1905

Transmit a capability information message on at least one of the first communication link or the second communication link, the capability information message comprising an indication that the first reconfigurable intelligent surface is capable of communicating with a second reconfigurable intelligent surface via at least one of the first communication link or the second communication link

1910

Transmit a beam information message to the second reconfigurable intelligent surface based at least in part on the capability information message via at least one of the first communication link or the second communication link, the beam information message comprising at least one of one or more phase values, one or more amplitude values, or one or more codebook weight values associated with the one or more reconfigurable intelligent surface elements

Figure 20:
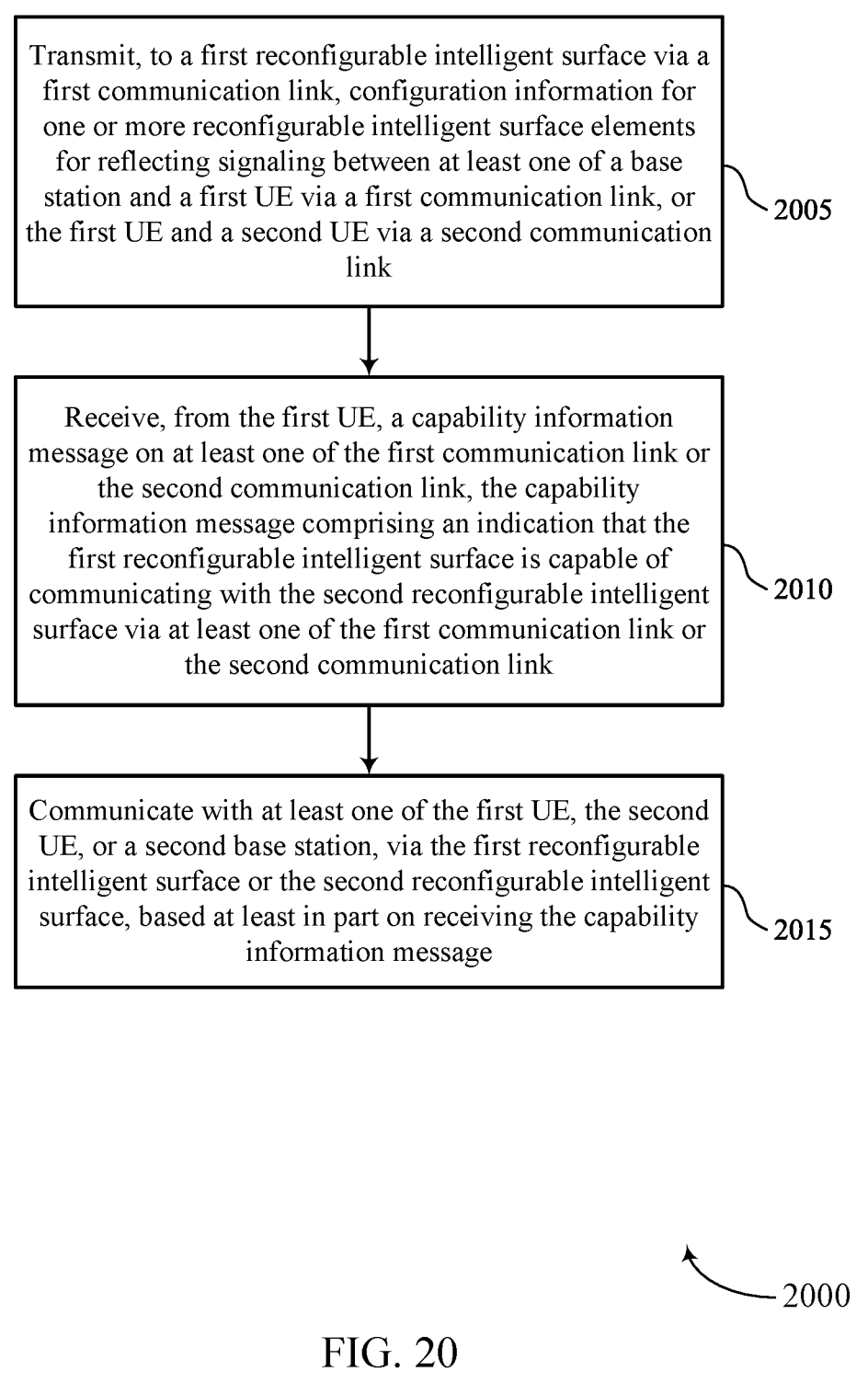

Transmit, to a first reconfigurable intelligent surface via a first communication link, configuration information for one or more reconfigurable intelligent surface elements for reflecting signaling between at least one of a base station and a first UE via a first communication link, or the first UE and a second UE via a second communication link

2005

Receive, from the first UE, a capability information message on at least one of the first communication link or the second communication link, the capability information message comprising an indication that the first reconfigurable intelligent surface is capable of communicating with the second reconfigurable intelligent surface via at least one of the first communication link or the second communication link

2010

Communicate with at least one of the first UE, the second UE, or a second base station, via the first reconfigurable intelligent surface or the second reconfigurable intelligent surface, based at least in part on receiving the capability information message

Figure 21:
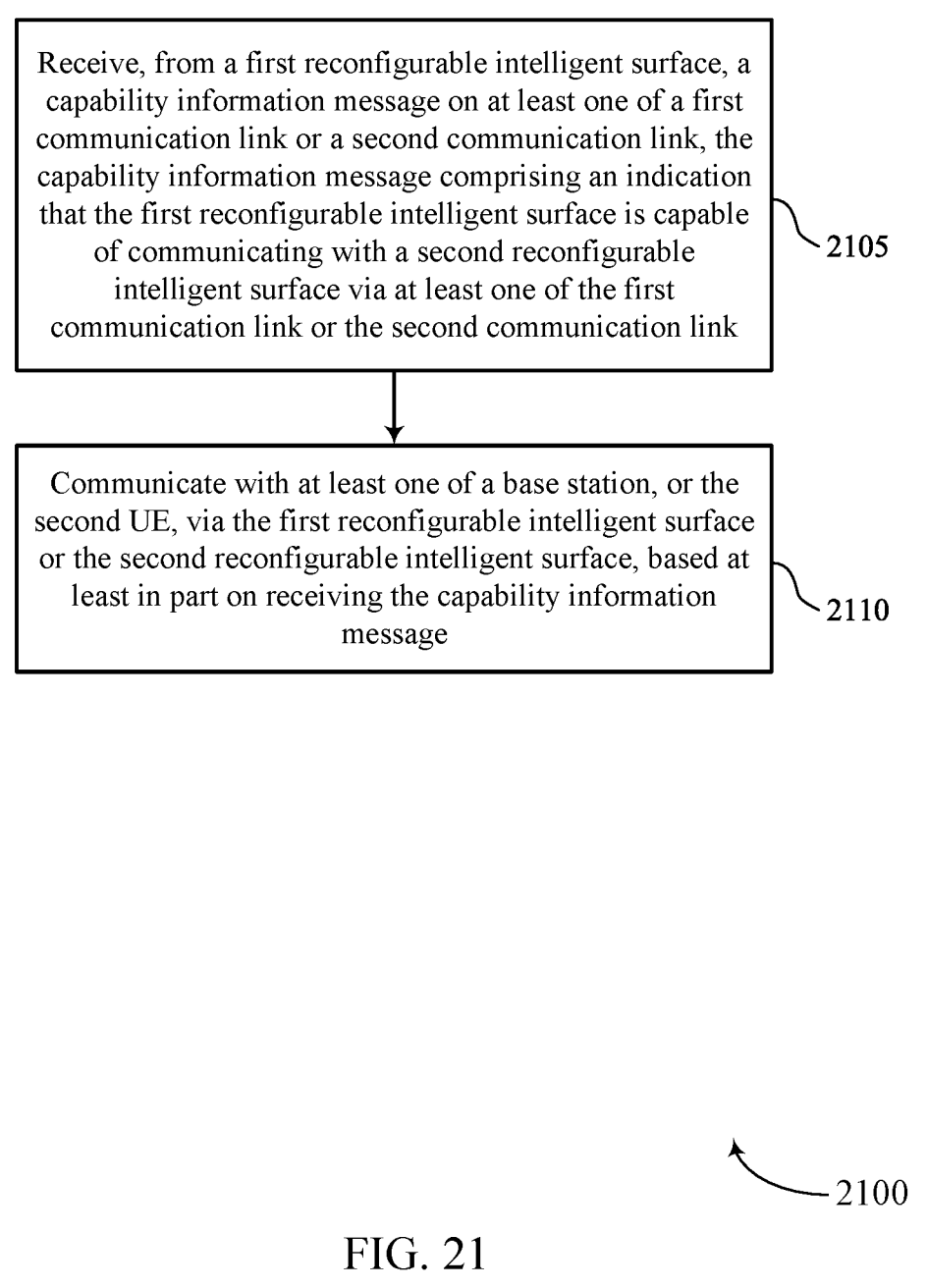

Receive, from a first reconfigurable intelligent surface, a capability information message on at least one of a first communication link or a second communication link, the capability information message comprising an indication that the first reconfigurable intelligent surface is capable of communicating with a second reconfigurable intelligent surface via at least one of the first communication link or the second communication link

2105

Communicate with at least one of a base station, or the second UE, via the first reconfigurable intelligent surface or the second reconfigurable intelligent surface, based at least in part on receiving the capability information message

NETWORK COMMUNICATIONS BETWEEN RECONFIGURABLE INTELLIGENT SURFACES

CROSS REFERENCE

The present application is a 371 national stage filing of International PCT Application No. PCT/CN2021/085793 by ELSHAFIE et al. entitled "NETWORK COMMUNICATIONS BETWEEN RECONFIGURABLE INTELLIGENT SURFACES," filed Apr. 7, 2021, which is assigned to the assignee hereof, and which is expressly incorporated by reference in its entirety herein.

FIELD OF TECHNOLOGY

The following relates to wireless communications, including network communications between reconfigurable intelligent surfaces (RISs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support network communications between reconfigurable intelligent surfaces (RISs). Generally, an RIS may signal beam information (e.g., values for RIS elements) to other RISs. To facilitate such signaling, an RIS may transmit a capability information message including an indicating that the RIS is capable of participating in network communications and communicating with other RISs on the network. A first RIS may communicate beam information to a second RIS directly (e.g., using Uu resources allocated by a base station, sidelink resource allocated by the base station operating in mode 1 sidelink procedures, or sidelink resources indicated by a user equipment (UE) or sensed by the first RIS). The first RIS may communicate beam information to the second RIS via a base station (e.g., on the Uu link). In such examples, the first RIS may transmit the beam information message to the base station, and the base station may relay the beam information message to the second RIS. In some examples, the first RIS may communicate beam information to the second RIS via another UE (e.g., on sidelink resources allocated by the base station operating in mode 1, the UE, or sensed by the first RIS). In some examples, one RIS may request beam information or reflecting assistance from another RIS.

BRIEF DESCRIPTION OF THE DRAWINGS

FIGS. 19 through 21 show flowcharts illustrating methods that support network communications between RISs in accordance with aspects of the present disclosure.

DETAILED DESCRIPTION

Figure 1:
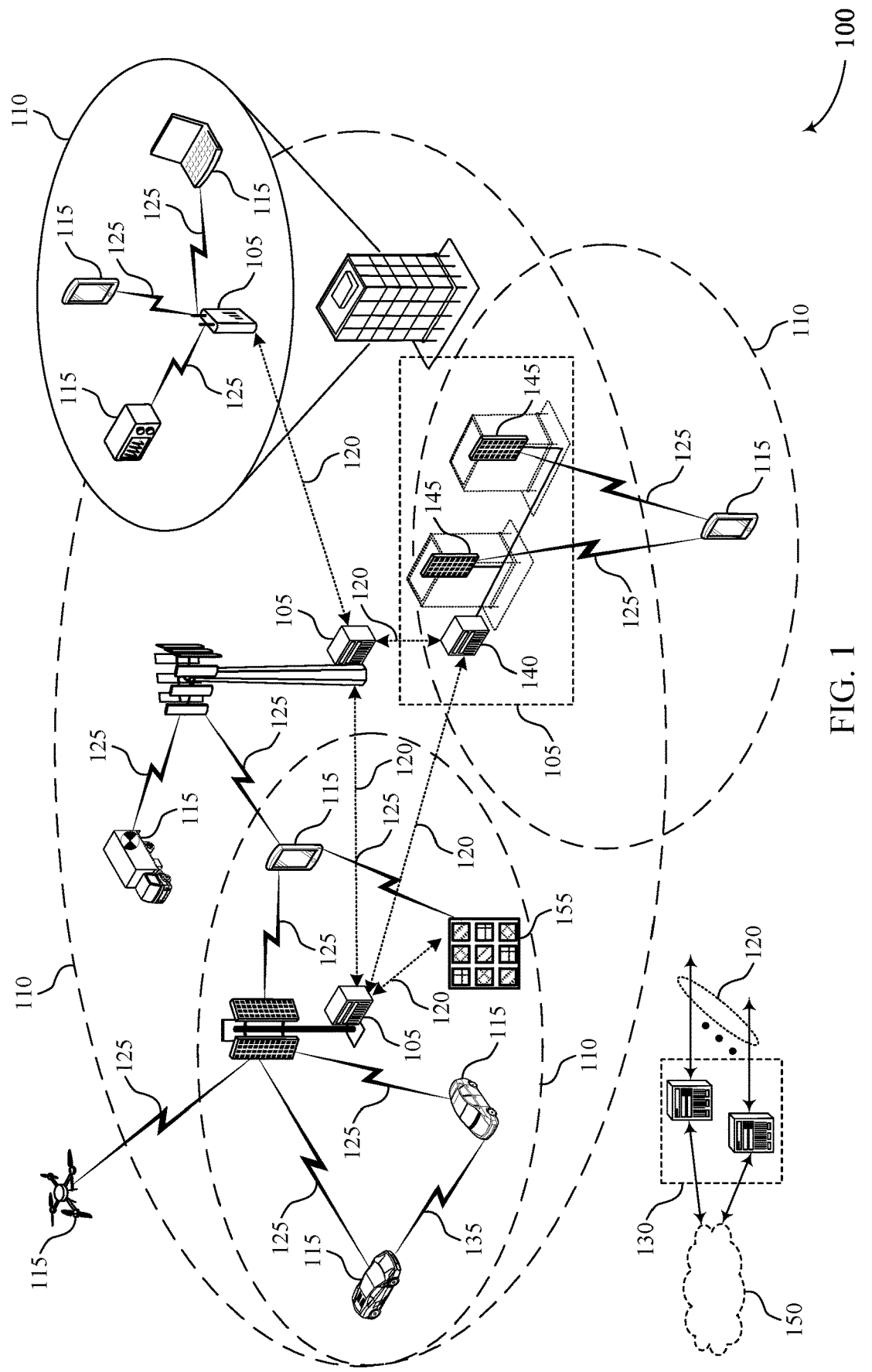
FIG. 1 illustrates an example of a wireless communications system that supports network communications between reconfigurable intelligent surfaces (RISs) in accordance with aspects of the present disclosure.

Some wireless communications systems may support communications between one or more base stations, and one or more user equipments (UEs) via one or more reconfigurable intelligent surfaces (RISs). RISs may intelligently reflect communications (e.g., Uu communications, sidelink communications, etc.) between devices (e.g., around blockages, etc.). RISs 205 may be a near passive devices that reflect incoming signals in a specific direction according to a configuration of the RIS. An MS may use one or more capacitors, resistors, and other passive components of one or more RIS elements to reflect signals between various wireless devices (e.g., base stations, UEs, etc.), rather than using active components to amplify and retransmit the signals. An RIS may configure one or more MS elements to reflect signaling based on configuration information received from a base station, a training procedure, or the like. In some examples, various RISs may benefit from beam information (e.g., phase values, amplitude values, weight values, or the like) determined by another MS. Such information may be used for reflecting signaling from the same or similar devices, or for initiating a beam acquisition or refinement procedure with a more accurate initial set of values, or the like. However, some wireless communications may not support signaling between RISs.

RISs may enhance network performance, extend coverage, and improve throughput, by signaling beam information (e.g., values for MS elements) to other RISs. To facilitate such signaling, an MS may transmit a capability information message including an indicating that the RIS is capable of participating in network communications and communicating with other RISs on the network.

A first RIS may communicate beam information to a second RIS directly (e.g., using Uu resources allocated by a base station, sidelink resource allocated by the base station operating in mode 1 sidelink procedures, or sidelink resources indicated by another UE or sensed by the first RIS). The first RIS may communicate beam information to the second RIS via a base station (e.g., on the Uu link). In such examples, the first RIS may transmit the beam information message to the base station, and the base station may relay the beam information message to the second RIS. In some examples, the first RIS may communicate beam information to the second RIS via another UE (e.g., on sidelink resources allocated by the base station operating in mode 1, the UE, or sensed by the first RIS). In some examples, one RIS may request beam information or reflecting assistance from another RIS.

Described techniques may support inter-MS communications for RISs that are capable of participating in network communications, which may result in more efficient beam forming, beam refinement, and beam acquisition procedures, more efficient use of computational resources, decreased system latency, extended coverage for one or more devices, increased throughput, and improved user experience.

Aspects of the disclosure are initially described in the context of wireless communications systems. Aspects of the disclosure are further illustrated by and described with reference to wireless communications systems and beam information messages. Aspects of the disclosure are further illustrated by and described with reference to apparatus diagrams, system diagrams, and flowcharts that relate to network communications between RISs.

FIG. 1 illustrates an example of a wireless communications system 100 that supports network communications between RISs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with trans-missions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

An RIS 155 may be a near passive device that reflects incoming signals in a specific direction according to a configuration of the RIS 155. An RIS 155 may signal beam information (e.g., values for RIS elements) to other RISs 155. To facilitate such signaling, an RIS may transmit a capability information message including an indicating that the RIS 155 is capable of participating in network communications and communicating with other RISs 155 on the network. A first RIS 155 may communicate beam information to a second RIS 155 directly (e.g., using Uu resources allocated by a base station 105, sidelink resource allocated by the base station operating in mode 1 sidelink procedures, or sidelink resources indicated by a user equipment (UE) 115 or sensed by the first RIS 155). The first RIS 155 may communicate beam information to the second RIS 155 via a base station (e.g., on the Uu link). In such examples, the first RIS 155 may transmit the beam information message to the base station 105, and the base station 105 may relay the beam information message to the second RIS 155. In some examples, the first RIS 155 may communicate beam information to the second RIS 155 via another UE 115 (e.g., on sidelink resources allocated by the base station 105 operating in mode 1, the UE 115, or sensed by the first RIS 155). In some examples, one RIS 155 may request beam information or reflecting assistance from another RIS.

Figure 2:
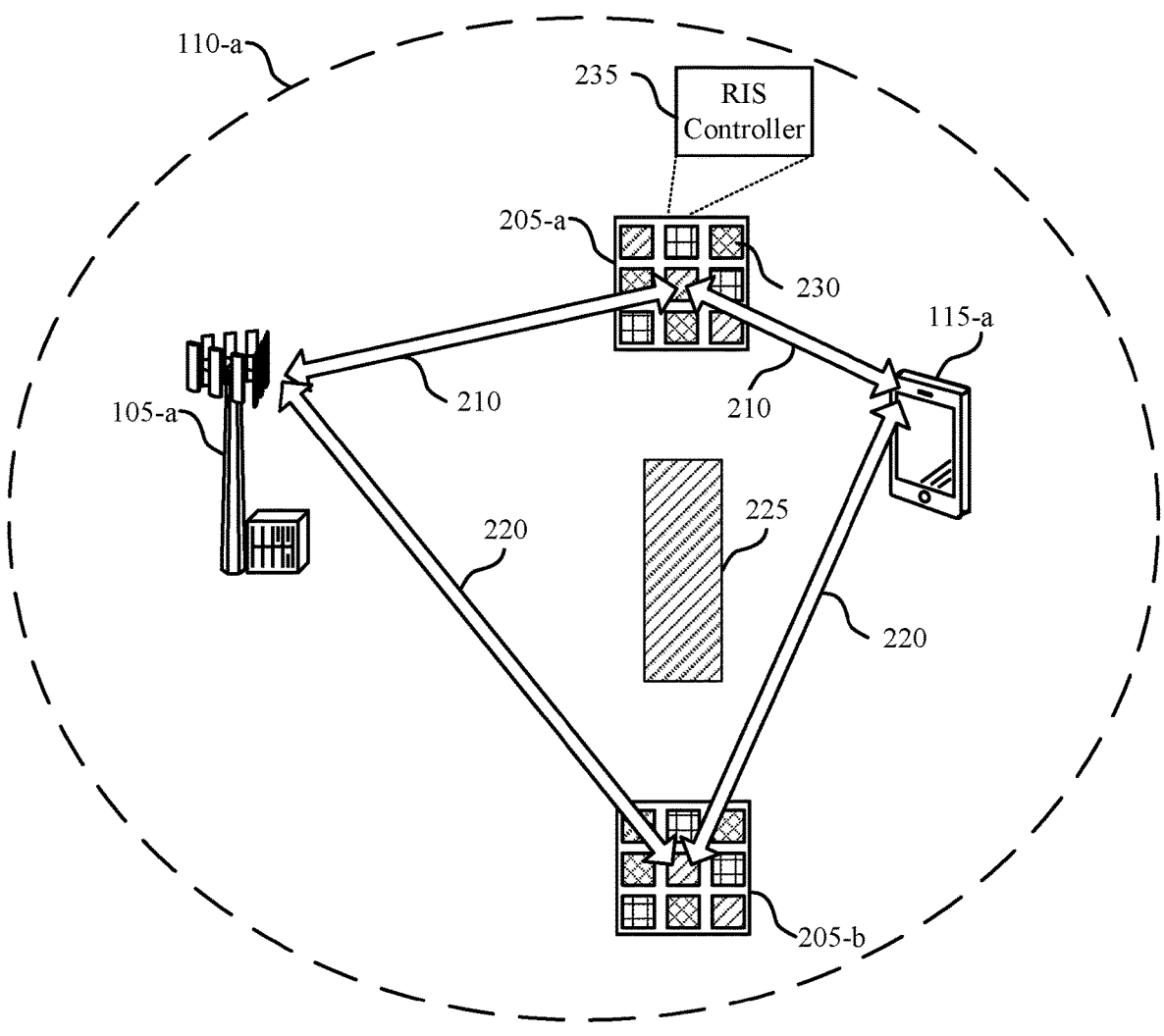
FIG. 2 illustrates an example of a wireless communications system that supports network communications between RISs in accordance with aspects of the present disclosure.

FIG. 2 illustrates an example of a wireless communications system 200 that supports network communications between RISs in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a, a UE 115-b, and a base station 105-a within a geographic coverage area 110-a. The base station 105 and the UEs 115 may be examples of corresponding devices described herein with reference to FIG. 1. In some examples, the wireless communications system 200 may support multiple radio access technologies including 4G systems such as LTE systems, LTE-A systems, or LTE-A Pro systems, and 5G systems which may be referred to as NR systems. Base station 105-a may communicate directly with one or more UEs 115 (e.g., via a cellular link, such as a Uu link). UEs 115 may communicate directly with each other via a sidelink (e.g., a PC5 interface).

Base station 105-a and one or more of the UE 115-a and the UE 115-b may perform wireless communications using one or more RISs 205, which may facilitate the wireless communications between the base station 105-a and the one or more of the UE 115-a and the UE 115-b. For example, wireless communications system 200 may support massive MIMO communications schemes. Massive MIMO may increase throughput, improve system efficiency, and improve user experience. Massive MIMO may also support high beamforming gain by using active antenna units, may support individual RF changes per antenna ports, and may result in a significant increase in power consumption due to the user of active antenna units (AAUs). Deployment of RISs 205 in wireless communications system 200 may result in extended 5G coverage with a small or negligible power consumption increase. RISs 205, may support such expansions and use of Massive MIMO signaling based on the fact that they are near passive devices. Each RIS 205 may be utilized to reflect impinging waves in a desired direction. In some examples, a reflection direction may be controlled by a base station 105-a.

In some examples, the UE 115-a and the base station 105-a may communicate within the geographic coverage area 110-a of the base station 105-a via a communications link 210. For example, the base station 105-a may configure the UE 115-a according to a first transmission configuration indication (TCI) state supportive of indirect communication of downlink channel transmissions (e.g., PDCCH, PDSCH transmissions) and downlink reference signals (e.g., CSI-RSs) and uplink channel transmissions (e.g., physical uplink control channel (PUCCH), or physical uplink shared channel (PUSCH) transmissions) and uplink reference signals (e.g., SRS) from and to the base station 105-a. The communications link 210 may be a RIS-based communications link and the UE 115-a and the base station 105-a may use a RIS 205-a to communicate via the communications link 210. In some cases, the UE 115-a and the base station 105-a may use multiple RISs 205 to communicate and a second communications link 220 may be configured according to a second TCI state supportive of indirect communication of, for example, uplink channel transmissions (e.g., PUCCH, PUSCH) and uplink reference signals (e.g., CSI-RSs) to the base station 105-a. The communications link 220 may be a RIS-based communications link using RIS 205-b.

In the wireless communications system 200, the RISs 205 may be a near passive devices that reflect incoming signals in a specific direction according to a configuration of the RIS 205. In some examples, the configuration of the RISs 205 may be determined based on a training procedure such as a beam refinement or beam selection procedure. RISs 205 may configure (e.g., based on the training procedure) RIS parameters (e.g., phase and amplitude parameters). RISs 205 may rely on multiple reference signal transmissions between the UE 115-a and base station 105-a via the RISs 205 to determine the RIS parameters. For example, for the communications link 210, the base station 105-a may transmit a series of reference signals to the UE 115-a via the RIS 205-a. Measurements of the reference signals may be used to identify parameters for RIS elements 230, and to identify a preferred precoding at the UE 115-a and base station 105-a based on the training procedure.

One or more of the RISs 205, such as RIS 205-a, may include a controller 235 (e.g., one or more processors with associated memory) that may determine a configuration for the RIS 205-*a*, such as based on a message from the base station 105-*a* (e.g., a RRC message, downlink control information (DCI), a medium access control (MAC) control element (CE) message, a message provided via a separate link between the RIS 205-*a* and base station 105-*a*, and the like) upon completion of the training procedure, or based on a predetermined or fixed configuration for an RIS 205-*a* (e.g., if the RIS does not have the capability to adjust RIS parameters as part of a training procedure as discussed herein). Based on the configuration, the MS 205-*a* may adjust one or more parameters to support the configuration. For example, the MS 205-*a* may use one or more capacitors, resistors, and other passive components to reflect signals between the base station 105-*a* and the UE 115-*a* (e.g., rather than using active components to amplify and re-transmit the signals). The RIS 205-*a* may adjust the capacitors, resistors, or combination thereof to support a specific configuration for one or more RIS elements 230 (e.g., based on a configuration message from the base station 105-*a*, the training procedures, or any combination thereof). The RISs 205 may have a wired connection or a wireless connection with the base station 105-*a*. Each RIS 205 may include at least one RIS element 230, a set of (e.g., all) RIS elements 230 for the MS 205, a subset of RIS elements 230 for the RIS 205, or any combination thereof.

RISs 205 may identify beam information for each RIS element 230 having an index value of i. RISs 205 may identify the beam information for each element based on the training procedure, signaling from base station 105-*a*, signaling form a UE 115, or any combination thereof. The beam information may include a phase values (e.g., $\varphi_i$) for each MS element 230, an amplitude value ($\alpha_i$), or the like. In some examples, an MS 205 may also determine beam information that includes one or more directional beams for communicating with base station 105-*a*, one or more directional beams for communicating with UE 115-*a*, a beam pair for reflecting communication between base station 105-*a* and UE 115-*a*, an angle of elevation or an angle of reflection for reflecting signaling between base station 105-*a* and UE 115-*a*, or any combination thereof.

Deployment of one or more RISs 205 may extend the coverage area 110-*a* of the base station 105-*a* and enable higher throughput in the wireless communications system 200. In some other aspects, using one or more RISs 205 may provide for communications between the base station 105-*a* and the UE 115-*a* under conditions in which direct communications may be unreliable. For example, interference resulting from physical proximity or environmental factors, such as a blockage 225, may be avoided or mitigated by communicating via one or more of the RISs 205.

Each RIS 205 may determine beam information for reflecting communications from one or more base stations 105 and one or more UEs 115. Determining beam information may take some amount of time. In some examples, beam information determined by a first MS 205-*a* may be beneficial to or utilized by RIS 205-*b*. However, some wireless communications systems (e.g., conventional systems) may not support communication between RISs 205.

Techniques described herein may support communication between RISs 205 (e.g., between MS 205-*a* and RIS 205-*b*). Communications between RISs 205 may result in improved system efficiency, faster determination of RIS element 230 configurations, decreased system latency, improved throughput, improved efficiency and support of massive MIMO procedures, and the like. For example, an RIS 205 may determine, and transmit to other RISs, symmetry between RISs 205 and transmitting and receiving nodes. For instance, RIS 205-*a* may determine a beam information (e.g., a configuration including amplitude values, phase values, both, or the like) for RIS elements 230 for reflecting communications from base station 105-*a* to UE 115-*a*. Such beam information may be partially utilized (e.g., as a starting point) or completely utilized (e.g., adopted) by RIS 205-*b* for relaying communications between base station 105-*a* and E 115-*a*.

In some examples, RIS 205-*a* may determine one or more beams (e.g., for reflecting communications between base station 105-*a* and UE 115-*a*). The one or more beams may include a current active beam or beam pair, a set of best or preferred beams or beam pairs, or the like. RIS 205-*a* may indicate the determined one or more beams to RIS 205-*b*, and RIS 205-*b* may compute its own one or more beams based on the indicated one or more beams (e.g., may use the indicated one or more beams as a starting point for a beam refinement or beam selection procedure). For example, RIS 205-*b* may compute its beam search based on a received beam from RIS 205-*a*, or the received one or more beams may be a starting point or initialization point (e.g., instead of a randomly selected beam or stale beam). In such examples, RIS 205-*b* may perform beam search, beam refinement, beam reflection, or beam management procedures that are faster than they would otherwise be without indicated beam information from RIS 205-*a*. In some examples, RIS locations may be known or predetermined. In such examples, RISs 205 may be easy to determine or locate, and conditions for or from RISs 205 may be easy to follow or comply with. In some examples, RIS 205-*b* may determine a location f RIS 205-*a*, and may determine or select one or more beams for reflecting communications between base station 105-*a* and UE 115-*a* based on beam information received from MS 205-*a* and location information for MS 205-*a*.

Techniques described herein may support communication of beam information (e.g., phase values, amplitude values, or both, for a matrix of RIS elements 230, beams, beam pairs, etc.) between RISs 205. RISs may share such information with other RISs 205, UEs 115, or the like.

In some examples, an RIS 205 may advertise its capability to participate in the network. An RIS 205 may transmit a capability information message to one or more other devices in wireless communications system 100 or wireless communications system 200. In some examples, an RIS 205 (e.g., RIS 205-*a*) may multicast or broadcast the capability information message. In some examples, an RIS 205 may transmit the capability information to other RISs 205, one or more base stations 105, one or more UEs 115, or any combination thereof. The capability information message may indicate that the transmitting RIS 205 (e.g., RIS 205-*a*) is capability of transmitting and receiving data messages, control messages, feedback messages, or any combination thereof. The capability information message may be an RRC message, a MAC-CE message. RIS 205-*a* may transmit a capability information on a Uu link, or a sidelink, or both. In some examples, communicating beam information to other RISs 205 may be based at least in part on having previously transmitted or received a capability information message. In some examples, the capability information message may indicate whether the transmitting RIS (e.g., RIS 205-*a*) is capable of finding (e.g., sensing) available resources (e.g., on a sidelink), or may include a request for assistance in performing sensing of sidelink resources. In some examples, assistance from other UEs 115 in identifying or utilizing sidelink resources, as described with reference to FIGS. 4 and 6, may be based at least in part on including such a request for assistance in the capability information message.

In some examples, other wireless devices may relay beam information between RISs 205-*a*. For example, as described in greater detail with reference to FIG. 3, RISs 205 may communicate beam information directly to other RISs 205. As described in greater detail with reference to FIG. 4, an MS may communicate beam information to another MS 205 via a base station 105. As described in greater detail with reference to FIG. 5, an RIS may communicate beam information to another RIS 205 via a UE 115. Formatting and content of beam information is described in greater detail with reference to FIG. 6.

In some examples, an RIS 205 may request beam information from another RIS. For example, RIS 205-*b* may transmit a request to RIS 205-*a*, requesting assistance with a beam search, or requesting beam information, or the like. In such examples, RIS 205-*a* may transmit the beam information to RIS 205-*b* in response to the request. RIS 205-*a* may transmit the beam information to RIS 205-*b* directly, via a base station 105-*a*, via a UE 115-*a*, or any combination thereof, as described in greater detail with reference to FIGS. 3-5. In some examples, RIS 205-*b* may transmit the request for beam information to RIS 205-*a* directly, via a base station 105-*a*, or via a UE 115-*a*. In such examples, techniques described with reference to FIGS. 3-5 may be utilized for transmitting the request for beam information. RIS 205-*b* may determine that RIS 205-*a* can provide beam information based on receiving, from RIS 205-*a*, the capability information message described herein, indicating that RIS 205-*a* is capable of communicating on the network (e.g., is capable of providing beam information to other RISs).

A request for beam information may include one or more device identifiers. For example, RIS 205-*b* may be reflecting communications between base station 105-*a* and UE 115-*a*, or may be preparing (e.g., configuring RIS elements 230) to reflect communications between base station 105-*a* and UE 115-*a*. In such examples, RIS 205-*b* may include, in the request, an identifier for base station 105-*a* and an identifier for UE 115-*a*. The request may therefore indicate that RIS 205-*b* is requesting beam information (e.g., assistance) specifically for communications between base station 105-*a* and UE 115-*a*. In such examples, RIS 205-*a* may provide beam information (e.g., phase values, amplitude values, etc.) that RIS 205-*a* uses for reflecting signaling between base station 105-*a* and UE 115-*a*. RIS 205-*b* may use the received raw beam information for reflecting signaling between base station 105-*a* and UE 115-*a*, or may use the received beam information as a starting point to configure RIS elements 230 for reflecting signaling between base station 105-*a* and UE 115-*a*. MS 205-*b* may then relay packets between base station 105-*a* and UE 115-*a* based on the received or modified received beam information.

In each of the examples described with reference to FIGS. 2-6, a receiving MS may utilize received beam information to relay packets between various devices (e.g., between base station 105-*a* and UE 115-*a*). For example, if RIS 205-*b* receive beam information from RIS 205-*a*, then RIS 205-*b* may use the received beam information, as is, to reflect packets between base station 105-*a* and UE 115-*a*. Or, in some examples, RIS 205-*b* may use the received beam information as a starting point in a training procedure, a beam acquisition procedure, or the like, to configure RIS elements 230 for relaying signaling between base station

105-*a* and UE 115-*a*, or between other wireless devices (e.g., between UEs 115, between another base station and another UE 115, or the like).

Figure 3:
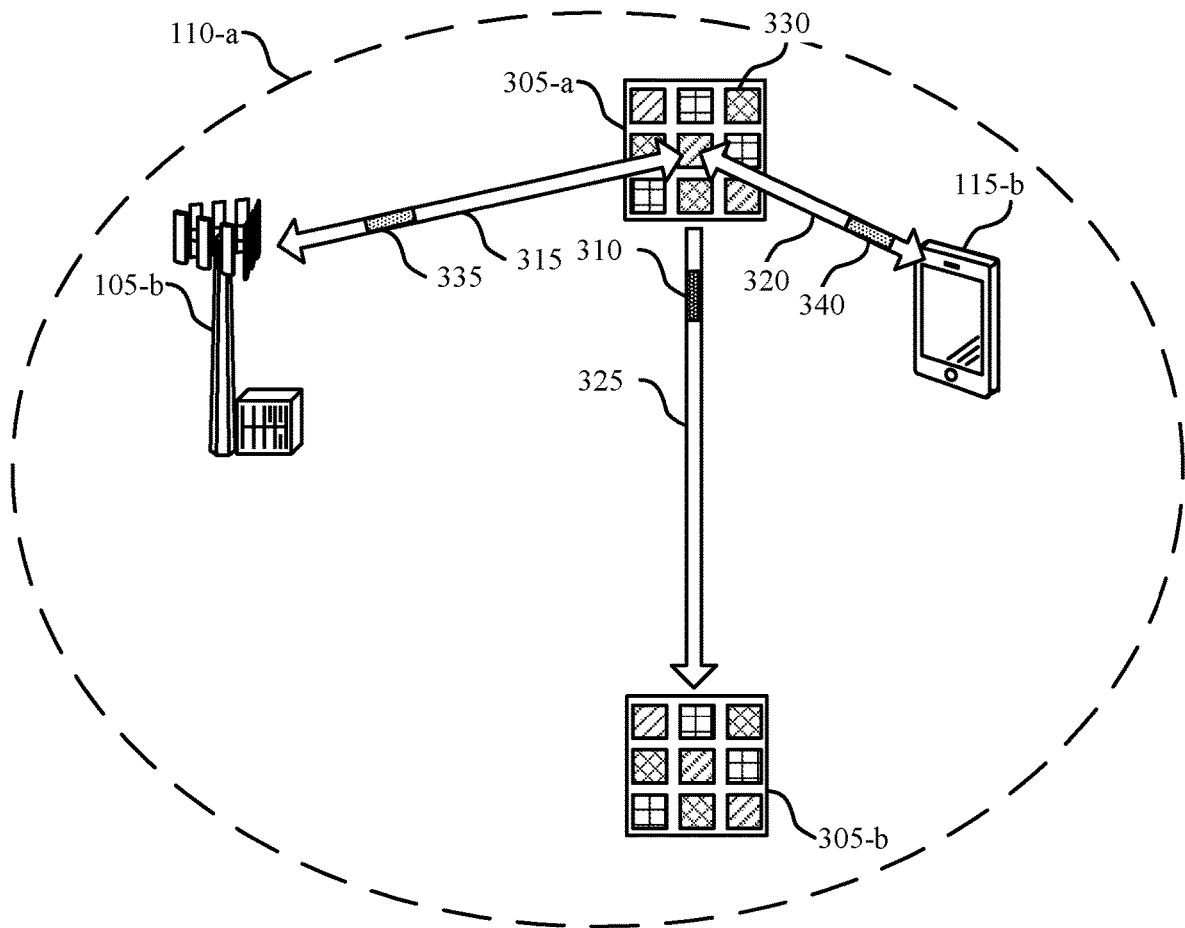
FIG. 3 illustrates an example of a wireless communications system that supports network communications between RISs in accordance with aspects of the present disclosure.

FIG. 3 illustrates an example of a wireless communications system 300 that supports network communications between RISs in accordance with aspects of the present disclosure. Wireless communications system 300 may include a base station 105-*b*, a UE 115-*b*, an RIS 305-*a*, an RIS 305-*b*, each of which may be examples of corresponding devices described with reference to FIGS. 1-2. Base station 105-*b* may communicate with one or more UEs 115, one or more RISs 305, or any combination thereof, via a Uu link. UE 115-*b* may communicate with base station 105-*b* via a Uu link, and may communicate with one or more additional UEs 115, RISs 305, or any combination thereof, via a sidelink.

An RIS 305 may provide beam information directly to another RIS 305 (e.g., instead of relaying the beam information to another RIS 305 via a base station 105 as described in greater detail with reference to FIG. 4 or via a UE 115 as described in greater detail with reference to FIG. 5). Beam information may include amplitude values, phase values, beam identifiers, or any combination thereof, for one or more RIS elements 330.

In some examples, MS 305-*a* may transmit a beam information message 310 (e.g., including the beam information) to RIS 305-*b* via a Uu link. In such examples, wireless channel 325 may be a wireless channel of a Uu link (e.g., a PUSCH or a PDSCH, or the like). For example, base station 105-*b* may transmit, to MS 305-*a* via Uu link 315, a grant 335 of Uu resources on wireless channel 325. Based on the dedicated allocation of Uu resources (e.g., via a DCI message including grant 355), MS 305-*a* may transmit the beam information message 310 to RIS 305-*b* via wireless channel 325 (e.g., on the Uu link).

In some examples, RIS 305-*a* may transmit beam information message 310 to RIS 305-*b* via sidelink resources allocated by a UE 115-*b*. In such examples, wireless channel 325 may be a sidelink channel (e.g., a physical sidelink shared channel (PSSCH), a physical sidelink control channel (PSCCH), or the like). UE 115-*b* may assist RIS 305-*a* in identifying sidelink resources on which to transmit the beam information message 310. For instance, UE 115-*b* may allocate sidelink resources to RIS 305-*a*. UE 115-*b* may transmit a grant 340 (e.g., in a sidelink control information (SCI) message) to RIS 35-*a* via sidelink 320 (e.g., a PSCCH). In such examples, RIS 305-*a* may transmit the beam information message 310 to RIS 305-*b* on the sidelink resources allocated by UE 115-*b*. UE 115-*b* may transmit grant 340 to RIS 305-*a* based at least in part on having received, from RIS 305-*a*, a capability information message requesting assistance in identifying sidelink resources.

In some examples, RIS 305-*a* may transmit beam information message 310 to RIS 305-*b* via sidelink resources allocated by base station 105-*b*. For example, one or more UEs 115 (e.g., including 115-*b*) may be operating in a first mode of sidelink communications (e.g., mode 1), where base station 105-*b* may manage allocation of sidelink resources. In such examples, base station 105-*b* may transmit grant 335 to RIS 305-*a* via the Uu link 315. In such examples, RIS 350-*a* may transmit the beam information message 310 directly to RIS 305-*b* using the sidelink resources indicated by grant 335 (e.g., on a PSSCH, a PSCCH, or the like). Base station 105-*b* may transmit grant 335 to RIS 305-*a* based at least in part on having received, from RIS 305-*a*, a capability information message requesting assistance in identifying sidelink resources.

In some examples, RIS 305-*a* may transmit beam information message 310 to RIS 305-*b* via sidelink resources sensed by RIS 305-*a*. RIS 305-*a* may be an advanced or smart MS 305 that is capable of sensing and finding available sidelink resources. In such examples, wireless channel 325 may be a sidelink channel (e.g., a PSSCH, a PSCCH, or the like). RIS 305-*a* may monitor for or otherwise sense available sidelink resources on wireless channel 325, and may transmit the beam information message 310 on the sensed sidelink resources. In such examples, RIS 305-*a* may include, in a capability information message as described in greater detail with reference to FIG. 2, an indication that MS 305-*a* is capable of sensing and identifying its own sidelink resources.

In some examples, a wireless device (e.g., a base station 105-*b*) may relay beam information from one MS 305 to another RIS 305, as described in greater detail with reference to FIG. 4.

Figure 4:
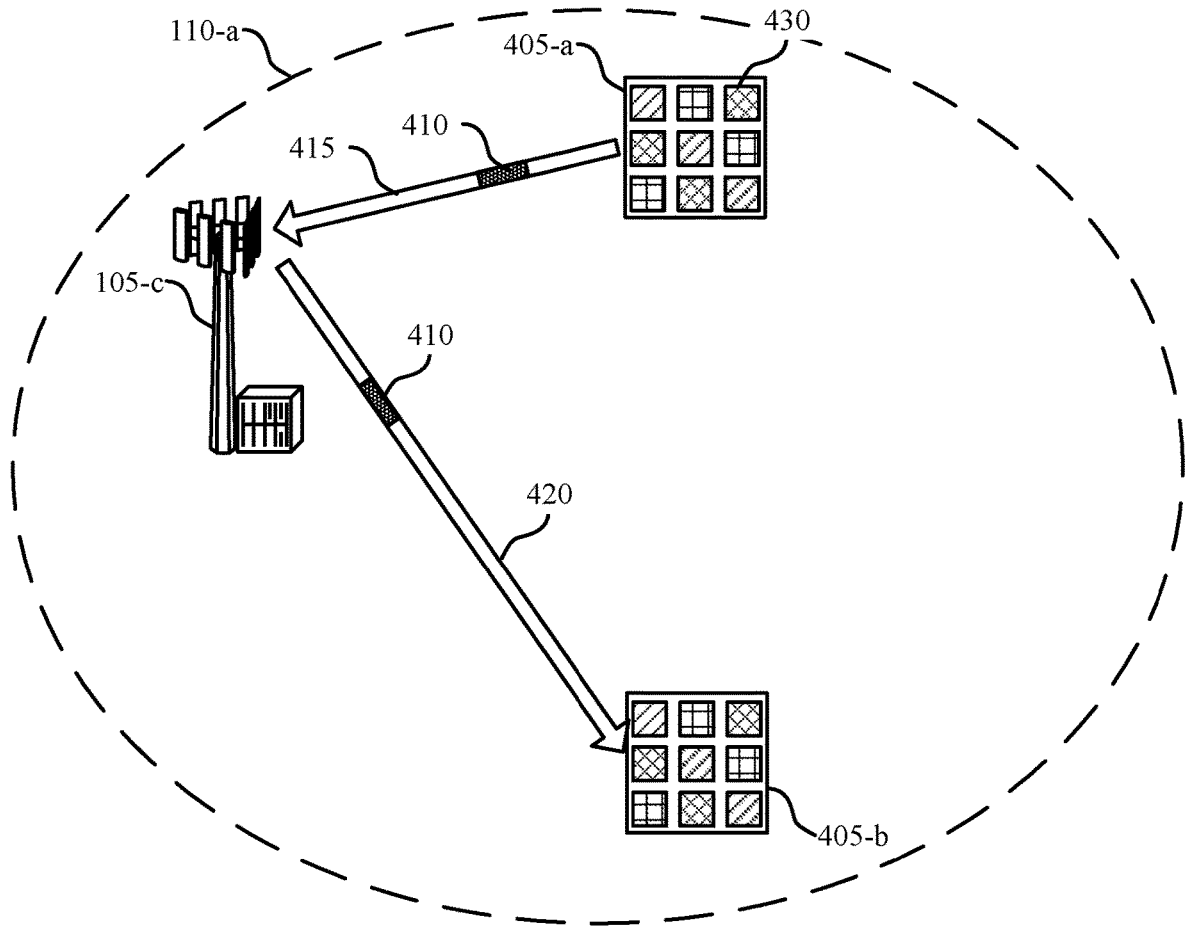
FIG. 4 illustrates an example of a wireless communications system that supports network communications between RISs in accordance with aspects of the present disclosure.

FIG. 4 illustrates an example of a wireless communications system 400 that supports network communications between RISs in accordance with aspects of the present disclosure. Wireless communications system 400 may include a base station 105-*c* and one or more RISs 405 (e.g., MS 405-*a* and RIS 405-*b*), which may be examples of corresponding devise described with reference to FIGS. 1-3. Base station 105-*c* may communicate with one or more UEs 115, one or more RISs 405, or any combination thereof, via a Uu link. UEs 115 may communicate with base station 105-*b* via a Uu link, and may communicate with one or more additional UEs 115, RISs 405, or any combination thereof, via a sidelink.

In some examples, base station 105-*c* may relay beam information from one MS 405 to another MS 405. The beam information may include amplitude values, phase values, beam identifiers, or any combination thereof, for one or more RIS elements 330.

MS 405-*a* may transmit, to base station 105-*c*, a beam information message 410 via the Uu link on a uplink channel 415 (e.g., a PUSCH). In some examples, base station 105-*c* may allocate resources on the Uu link to MS 405-*a* for transmitting beam information message 410. Base station 105-*c* may transmit beam information message 410 to MS 405-*b* via the Uu link on a downlink channel 420 (e.g., a PDSCH or a PDCCH). In some examples, base station 105-*c* may transmit the beam information message 410 to in an RRC message, a MAC-CE, a DCI message, or any combination thereof.

In some examples, a UE 115 may relay the beam information message 410 from one RIS 405 to another RIS 405, as illustrated in greater detail with reference to FIG. 5.

Figure 5:
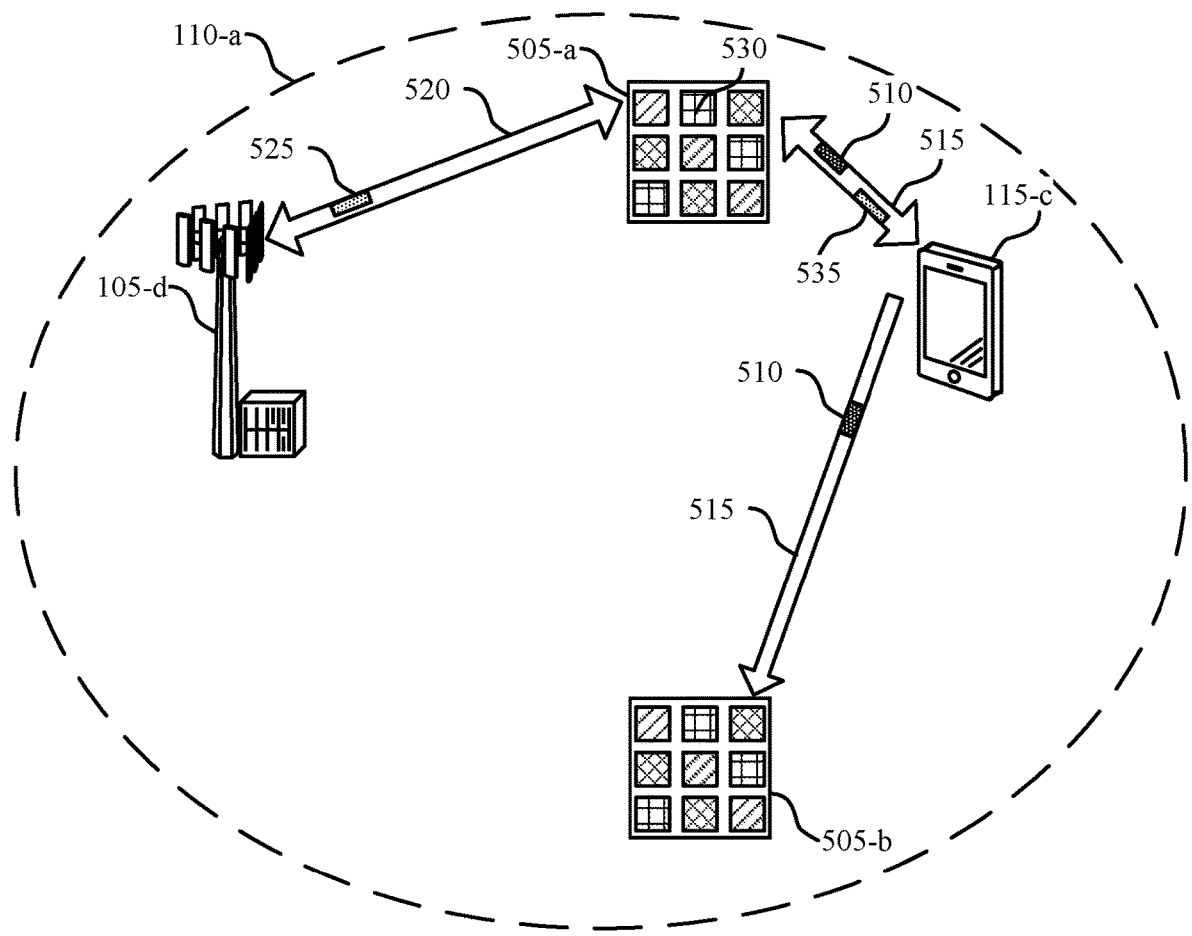
FIG. 5 illustrates an example of a wireless communications system that supports network communications between RISs in accordance with aspects of the present disclosure.

FIG. 5 illustrates an example of a wireless communications system 500 that supports network communications between RISs in accordance with aspects of the present disclosure. Wireless communications system 500 may include a base station 105-*d*, a UE 115-*c*, an RIS 505-*a*, and an RIS 505-*b*, which may be examples of corresponding devices described with reference to FIGS. 1-4. In some examples, base station 105-*d* may communicate with one or more UEs 115, and one or more RISs 505, via a Uu link. UEs 115 may communicate with each other, and one or more RISs 505, via a sidelink.

RIS 505-*a* may transmit a beam information message 510 to RIS 505-*b* via a UE 115-*c*. For instance, RIS 505-*a* may transmit beam information message 510 on a sidelink 515 (e.g., a PSSCH, a PSCCH, or the like) to UE 115-*c*. UE 115-*c* may relay the beam information message 510 to RIS 505-*b* via sidelink 515 (e.g., a PSSCH, a PSCCH, or the like). The beam information may include amplitude values, phase values, beam identifiers, or any combination thereof, for one or more RIS elements 530.

In some examples, base station 105-*d* may allocate resources on sidelink 515 to RIS 505-*a*. For example, one or more UEs 115-*c* may be operating in a first mode (e.g., mode 1), where base station 105-*d* allocates sidelink resources on sidelink 515. In such examples, base station 105-*d* may transmit a grant 525 (e.g., in a DCI message) to RIS 505-*a* via a Uu link 520 (e.g., on a PDCCH). In such examples, RIS 505-*a* may transmit beam information message 5810 to UE 115-*c* using the allocated resources on sidelink 515.

In some examples, UE 115-*c* may assist RIS 505-*a* in identifying resources on sidelink 515. In some examples, UE 115-*c* may identify resources on sidelink 515, and may transmit grant 535 allocating the identified resources to RIS 505-*a*. UE 115-*c* may transmit grant 535 on a PSCCH. RIS 505-*a* may then transmit the beam information message 510 to UE 115-*c* on the indicated resources on sidelink 515. In some examples, UE 115-*c* may transmits grant 535 based at least in part on having received a capability information message from RIS 505-*a*, the capability information message including a request to assist in identifying sidelink resources on which to transmit beam information message 510.

In some examples, RIS 505-*a* may identify sidelink resources on sidelink 515 on which to transmit the beam information message 510. RIS 505-*a* may autonomously sense or monitor sidelink channels on sidelink 515 to identify sidelink resources. In such examples, RIS 505-*a* and UE 115-*c* may coordinate to identify or sense sidelink resources. RIS 505-*a* may sense or combine sensing information with UE 115-*c*, or RIS 505-*b*, or both, and may identify sidelink resources based thereon. Upon identifying sidelink resources on sidelink 515, RIS 505-*a* may transmit the beam information message 510 on the identified sidelink resources.

Figure 6:
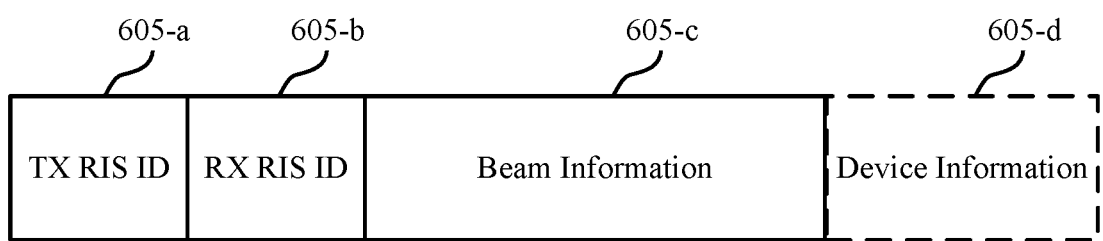
FIG. 6 illustrates an example of a beam information message that supports network communications between RISs in accordance with aspects of the present disclosure.

FIG. 6 illustrates an example of a beam information message 600 that supports network communications between RISs in accordance with aspects of the present disclosure. Beam information message 600 may be transmitted by or received by on or more RISs, which may be examples of RISs described with reference to FIGS. 1-6. Beam information message 600 may be received and relayed by a base station 105, a UE 115, or other wireless devices, which may be examples of corresponding devices described with reference to FIGS. 1-5. Beam information message 600 may be transmitted on a Uu link, a sidelink, or the like, which may be examples of wireless or wired communication links described with reference to FIGS. 1-5.

In some examples, a RIS may generate a beam information message 600. The RIs may generate the beam information message 600 based on configuration information received from a base station 105, or based on a training procedure (e.g., a beam training procedure, a beam acquisition procedure, a beam refinement procedure, or the like), or both.

Beam information message 600 may include one or more fields 605. For example, field 605-*a* may include a transmitting RIS identifier (e.g., TX RIS ID). The transmitting RIS identifier may include an identifier for the RIS that is transmitting the beam information message 600. Field 605-*b* may include a receiving RIS identifier (e.g., RX MS ID). The receiving MS identifier may include an identifier for the RIS to which the beam information message 600 is addressed. In some examples, a relaying device (e.g., a base station as described with reference to FIG. 4 or a UE 115 as described with reference to FIG. 5) may determine the receiving MS based on the receiving MS identifier included in the beam information message 600.

Beam information message 600 may include a field for beam information (e.g., field 605-*c*). The beam information may include codebook based beams (e.g., phase values and amplitude values) that the transmitting RIS is using or has recently used for transferring beam knowledge (e.g., directly, via a base station, or via a UE). The beam information may include codebook weights, an entire phase value and amplitude value grid shared by an index value, a matrix of phase values and amplitude values for a set of RIS elements, or any combination thereof. For example, RISs may be configured with one or more grids of phase and amplitude values. Beam information in field 605-*c* may simply include an index for one of the configured grids. In some examples, the beam information may include a matrix of indexed values for indexed RIS elements. In such examples, the receiving RIS may configure its own RIS elements according to the matrix included in field 605-*c*.

In some examples, beam information message 600 may include a device information field (e.g., field 605-*d*). Beam pair information field 605-*d* may include on or more device identifiers for devices that are reflecting communications off of the RIS. For example, a base station 105 and a UE 115 may be communicating by reflecting signaling off of the RIS. In such examples, field 605-*d* may include device identifiers for the UE 115 and the base station 105 (e.g., a TX-RX pair that are served with the beam information indicated in field 605-*c*). In some examples, if multiple transmitter and receiver pairs are using the RIS, device information field 605-*d* may include multiple pairs of device identifiers for each pair of transmitting and receiving devices.

Figure 7:
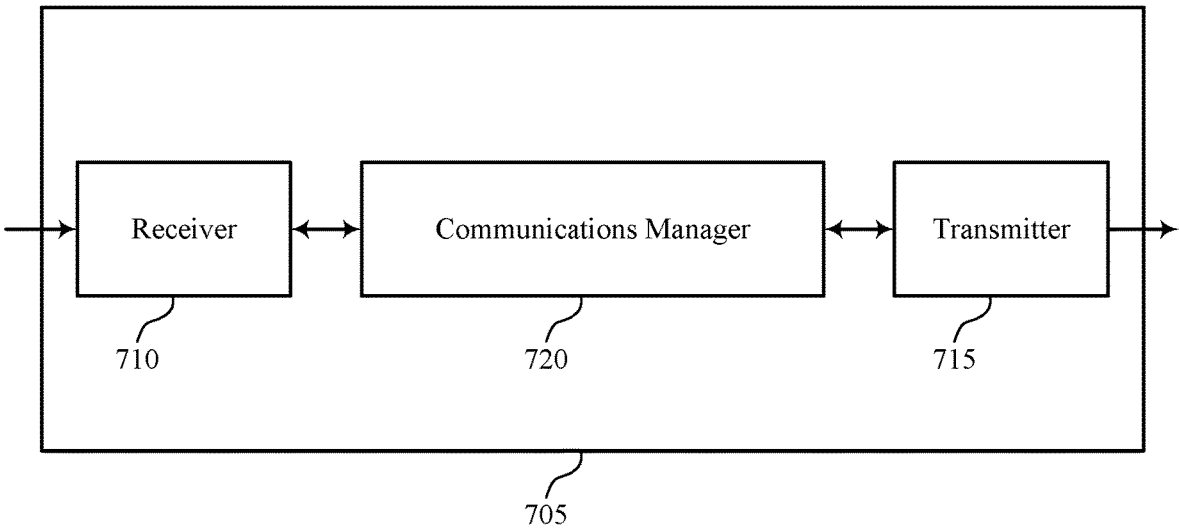
FIGS. 7 and 8 show block diagrams of devices that support network communications between RISs in accordance with aspects of the present disclosure.

FIG. 7 shows a block diagram 700 of a device 705 that supports network communications between RISs in accordance with aspects of the present disclosure. The device 705 may be an example of aspects of an RIS as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to network communications between RISs). Information may be passed on to other components of the device 705. The receiver 710 may utilize a single RIS element or multiple RIS elements. The receiver 710 may be part of a transceiver, or a controller of an RIS. The receiver 710 may communicate with one or more devices via a single antenna or multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to network communications between RISs). In some examples, the transmitter 715 may be co-located with a receiver 710 in a transceiver module. The transmitter 715 may utilize a single antenna or a set of multiple antennas. The transmitter 715 may be part of a transceiver or a controller of an RIS. The transmitter 715 may communicate with one or more devices via a single antenna or multiple antennas.

The communications manager 720, the receiver 710, the transmitter 715, or various combinations thereof or various components thereof may be examples of means for performing various aspects of network communications between RISs as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first reconfigurable intelligent surface in accordance with examples as disclosed herein. For example, the communications manager 720 may be configured as or otherwise support a means for configuring, by a controller of the first reconfigurable intelligent surface, one or more reconfigurable intelligent surface elements for reflecting signaling between at least one of a base station and first UE via a first communication link, or the first UE and a second UE via a second communication link. The communications manager 720 may be configured as or otherwise support a means for transmitting a capability information message on at least one of the first communication link or the second communication link, the capability information message including an indication that the first reconfigurable intelligent surface is capable of communicating with a second reconfigurable intelligent surface via at least one of the first communication link or the second communication link. The communications manager 720 may be configured as or otherwise support a means for transmitting a beam information message to the second reconfigurable intelligent surface based on the capability information message via at least one of the first communication link or the second communication link, the beam information message including at least one of one or more phase values, one or more amplitude values, or one or more codebook weight values associated with the one or more reconfigurable intelligent surface elements.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for RISs communicating with each other and participating in network communications, which may result in more efficient beam forming, beam refinement, and beam acquisition procedures, more efficient use of computational resources, decreased latency, extended coverage for one or more devices, increased throughput, and improved user experience.

Figure 8:
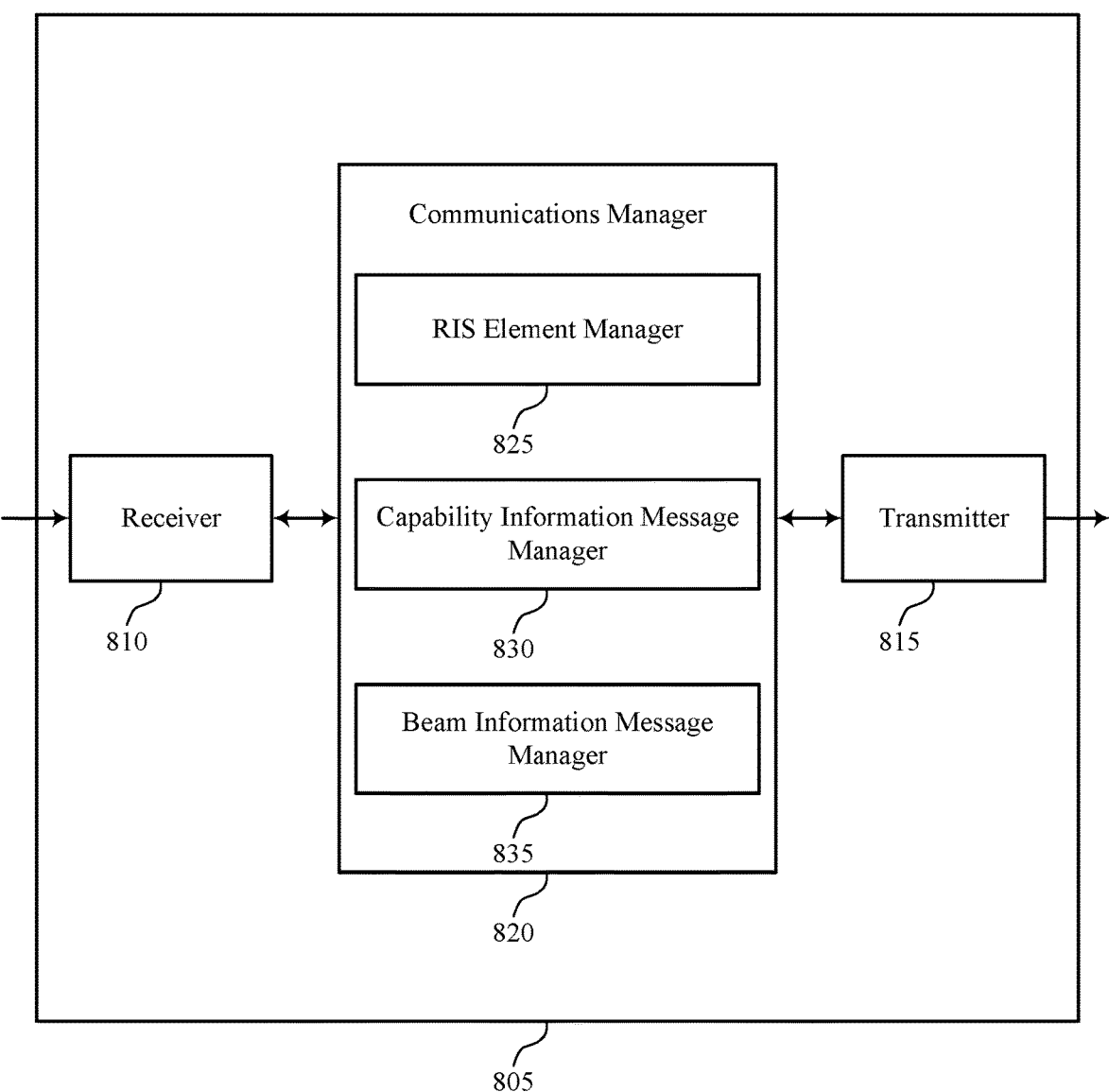

FIG. 8 shows a block diagram 800 of a device 805 that supports network communications between RISs in accordance with aspects of the present disclosure. The device 805 may be an example of aspects of a device 705 or an RIS as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to network communications between RISs). Information may be passed on to other components of the device 805. The receiver 810 may utilize a single RIS element or a set of RIS elements. The receiver 810 may be part of a controller or a transceiver of an RIS. The receiver 810 may communicate with one or more devices via a single antenna or multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to network communications between RISs). In some examples, the transmitter 815 may be co-located with a receiver 810 in a transceiver module. The transmitter 815 may utilize a single RIS element or a set of RIS elements. The transmitter 815 may communicate with one or more devices via a single antenna or multiple antennas.

The device 805, or various components thereof, may be an example of means for performing various aspects of network communications between RISs as described herein. For example, the communications manager 820 may include a RIS element manager 825, a capability information message manager 830, a beam information message manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first reconfigurable intelligent surface in accordance with examples as disclosed herein. The RIS element manager 825 may be configured as or otherwise support a means for configuring, by a controller of the first reconfigurable intelligent surface, one or more reconfigurable intelligent surface elements for reflecting signaling between at least one of a base station and first UE via a first communication link, or the first UE and a second UE via a second communication link. The capability information message manager 830 may be configured as or otherwise support a means for transmitting a capability information message on at least one of the first communication link or the second communication link, the capability information message including an indication that the first reconfigurable intelligent surface is capable of communicating with a second reconfigurable intelligent surface via at least one of the first communication link or the second communication link. The beam information message manager 835 may be configured as or otherwise support a means for transmitting a beam information message to the second reconfigurable intelligent surface based on the capability information message via at least one of the first communication link or the second communication link, the beam information message including at least one of one or more phase values, one or more amplitude values, or one or more codebook weight values associated with the one or more reconfigurable intelligent surface elements.

Figure 9:
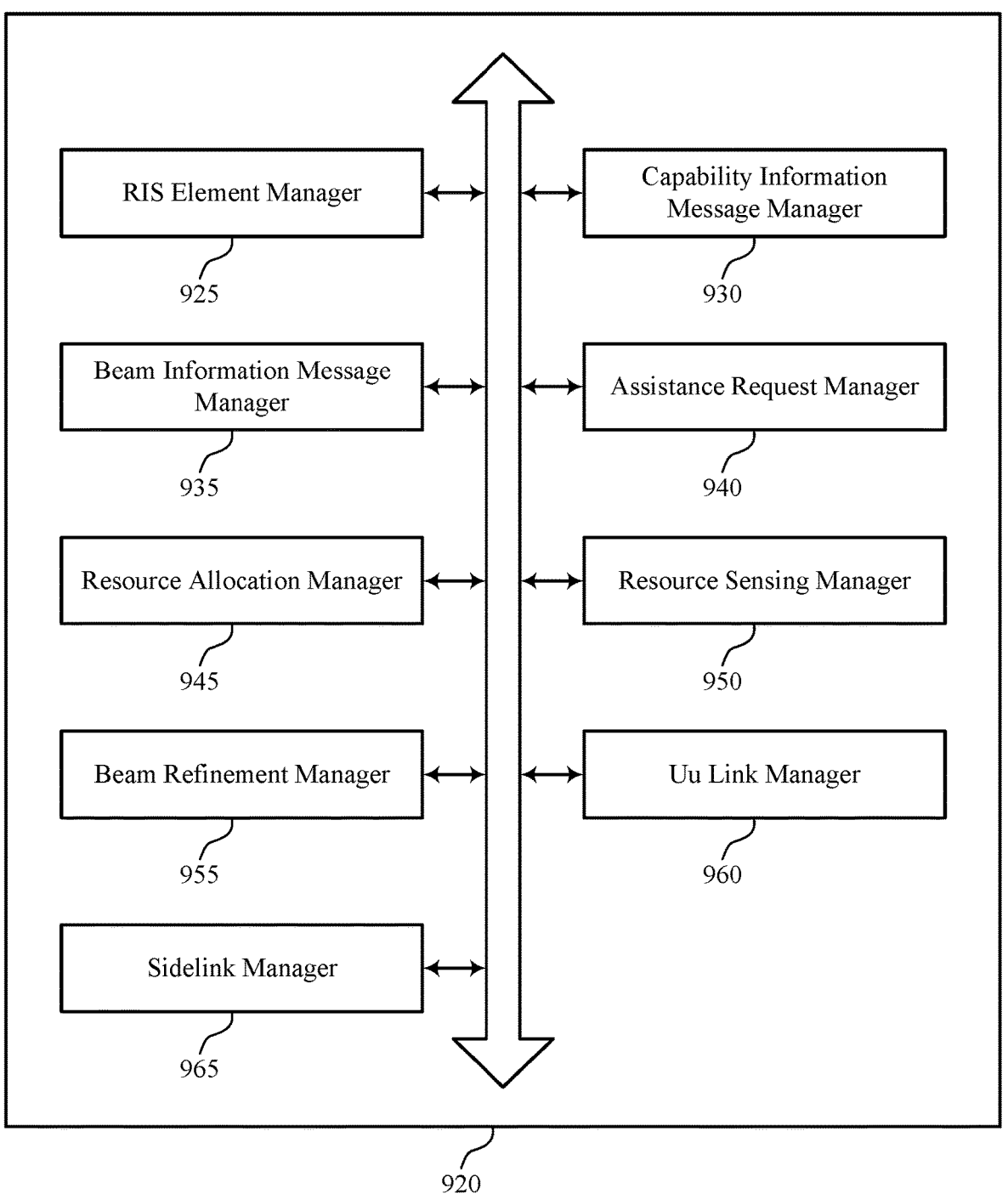
FIG. 9 shows a block diagram of a communications manager that supports network communications between RISs in accordance with aspects of the present disclosure.

FIG. 9 shows a block diagram 900 of a communications manager 920 that supports network communications between RISs in accordance with aspects of the present disclosure. The communications manager 920 may be an example of aspects of a communications manager 720, a communications manager 820, or both, as described herein. The communications manager 920, or various components thereof, may be an example of means for performing various aspects of network communications between RISs as described herein. For example, the communications manager 920 may include a RIS element manager 925, a capability information message manager 930, a beam information message manager 935, an assistance request manager 940, a resource allocation manager 945, a resource sensing manager 950, a beam refinement manager 955, an Uu link manager 960, a sidelink manager 965, or any combination thereof. Each of these components may communicate, directly or indirectly, with one another (e.g., via one or more buses).

The communications manager 920 may support wireless communications at a first reconfigurable intelligent surface in accordance with examples as disclosed herein. The RIS element manager 925 may be configured as or otherwise support a means for configuring, by a controller of the first reconfigurable intelligent surface, one or more reconfigurable intelligent surface elements for reflecting signaling between at least one of a base station and first UE via a first communication link, or the first UE and a second UE via a second communication link. The capability information message manager 930 may be configured as or otherwise support a means for transmitting a capability information message on at least one of the first communication link or the second communication link, the capability information message including an indication that the first reconfigurable intelligent surface is capable of communicating with a second reconfigurable intelligent surface via at least one of the first communication link or the second communication link. The beam information message manager 935 may be configured as or otherwise support a means for transmitting a beam information message to the second reconfigurable intelligent surface based on the capability information message via at least one of the first communication link or the second communication link, the beam information message including at least one of one or more phase values, one or more amplitude values, or one or more codebook weight values associated with the one or more reconfigurable intelligent surface elements.

In some examples, the beam information message manager 935 may be configured as or otherwise support a means for including, in the beam information message, at least one of an identifier for the first reconfigurable intelligent surface, or an identifier for the second reconfigurable intelligent surface.

In some examples, the beam information message manager 935 may be configured as or otherwise support a means for including, in the beam information message, at least one of an identifier for the base station, an identifier for the first UE, an identifier for the second UE, an indication of a pairing of the base station and the UE, or an indication of a pairing between the first UE and the second UE.

In some examples, the capability information message manager 930 may be configured as or otherwise support a means for including, in the capability information message, an indication that the first reconfigurable intelligent surface is capable of transmitting and receiving at least one of data messages, control messages, or feedback messages via at least one of the first communication link or the second communication link.

In some examples, the capability information message manager 930 may be configured as or otherwise support a means for including, in the capability information message, an indication that the first reconfigurable intelligent surface is capable of autonomously identifying resources on the second communication link.

In some examples, the assistance request manager 940 may be configured as or otherwise support a means for including, in the capability information message, a request for assistance in identifying resources on the second communication link.

In some examples, the resource allocation manager 945 may be configured as or otherwise support a means for receiving, from the base station, an allocation of resources on the first communication link, where the beam information message is transmitted directly to the second reconfigurable intelligent surface via the allocated resources on the first communication link.

In some examples, the resource allocation manager 945 may be configured as or otherwise support a means for receiving, from the first UE, an allocation of resources on the second communication link, where the beam information message is transmitted directly to the second reconfigurable intelligent surface via the allocated resources on the second communication link.

In some examples, the resource sensing manager 950 may be configured as or otherwise support a means for sensing, by the first reconfigurable intelligent surface, one or more resources on the second communication link, where the beam information message is transmitted directly to the second reconfigurable intelligent surface via the sensed one or more resources on the second communication link.

In some examples, to support transmitting the beam information message, the beam information message manager 935 may be configured as or otherwise support a means for transmitting the beam information message to the second reconfigurable intelligent surface via the base station on the first communication link.

In some examples, to support transmitting the beam information message, the resource allocation manager 945 may be configured as or otherwise support a means for determining resources on the second communication link for transmitting the beam information message to the first UE or the second UE. In some examples, to support transmitting the beam information message, the beam information message manager 935 may be configured as or otherwise support a means for transmitting the beam information message to the second reconfigurable intelligent surface via the first UE or the second UE on the determined resources on the second communication link.

In some examples, to support determining the resources on the second communication link, the resource allocation manager 945 may be configured as or otherwise support a means for receiving, from at least one of the base station, the first UE, or the second UE, an allocation of the resources on the second communication link.

In some examples, to support determining the resources on the second communication link, the resource sensing manager 950 may be configured as or otherwise support a means for autonomously sensing the resources on the second communication link.

In some examples, the assistance request manager 940 may be configured as or otherwise support a means for receiving, from the second reconfigurable intelligent surface, a request for the beam information message, where transmitting the beam information message is based on the request.

In some examples, the request includes an indication of beam information for at least one of a base station or a UE.

In some examples, to support configuring the one or more reconfigurable intelligent surface elements, the beam refinement manager 955 may be configured as or otherwise support a means for performing a beam refinement procedure with at least one of the base station, the first UE, or the second UE, where determining the beam information message is based on the beam refinement procedure.

In some examples, the first communication link includes a cellular link. In some examples, the second communication link includes a sidelink.

Figure 10:
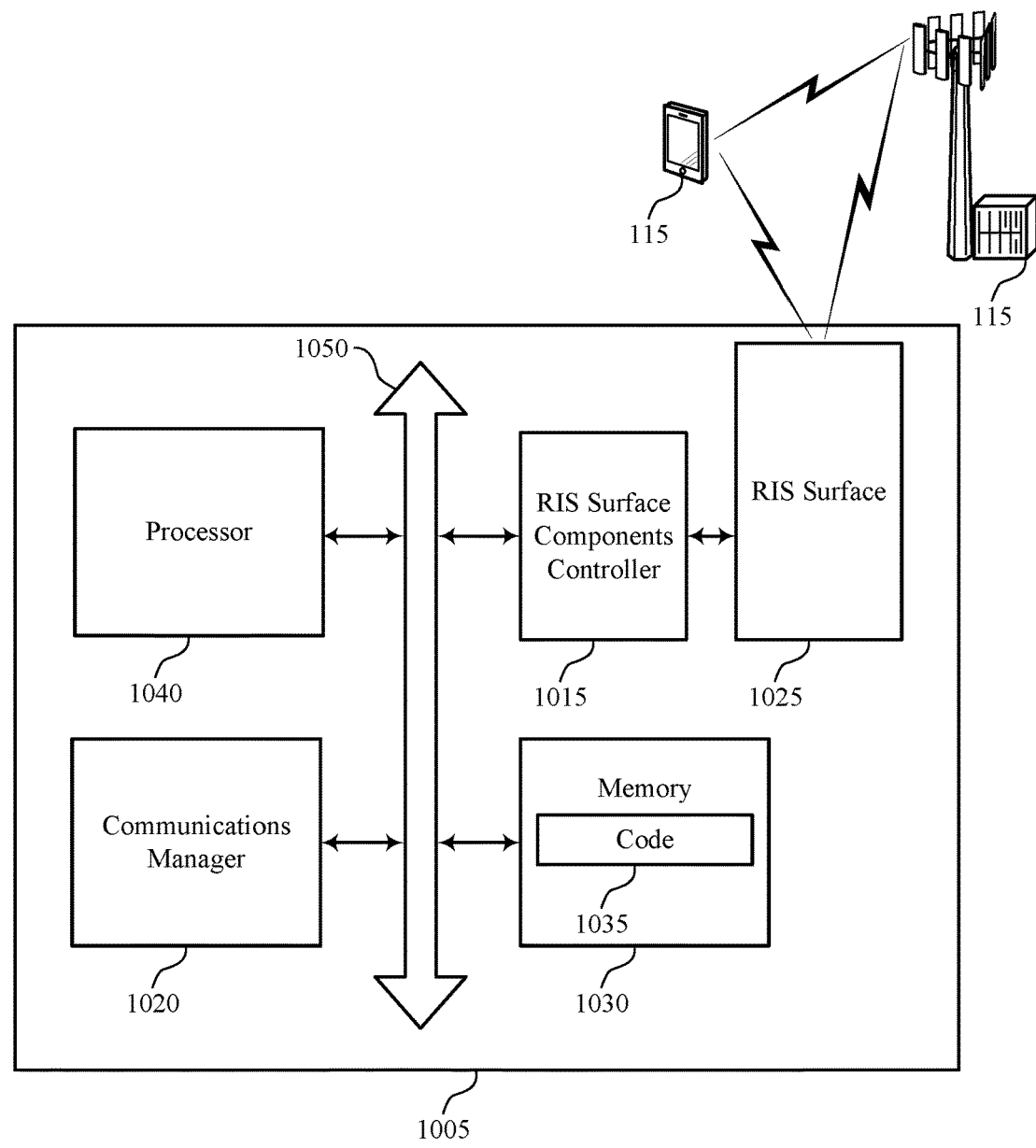
FIG. 10 shows a diagram of a system including a device that supports network communications between RISs in accordance with aspects of the present disclosure.

FIG. 10 shows a diagram of a system 1000 including a device 1005 that supports network communications between RISs in accordance with aspects of the present disclosure. The device 1005 may be an example of or include the components of a device 705, a device 805, or an RIS as described herein. The device 1005 may communicate wirelessly with one or more base stations 105, UEs 115, or any combination thereof. The device 1005 may include components for reflecting signals between devices, including components for transmitting and receiving communications, such as a communications manager 1020, an RIS surface components controller 1015 (e.g., a controller for tunable resistors and capacitors associated with each RIS element), an RIS surface 1025 (e.g., that include an array of RIS elements), a memory 1030, code 1035, and a processor 1040. These components may be in electronic communication or otherwise coupled (e.g., operatively, communicatively, functionally, electronically, electrically) via one or more buses (e.g., a bus 1050).

In some cases, the device 1005 may include one or more antennas for communicating with a base station (e.g., to provide capability information, communicate with other RISs, relay signaling via a UE 115 or a base station 105, or the like). The RIS surface 1025 may reflect an impinging wave in a desired direction, via the one or more RIS elements, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting network communications between RISs). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first reconfigurable intelligent surface in accordance with examples as disclosed herein. For example, the communications manager 1020 may be configured as or otherwise support a means for configuring, by a controller of the first reconfigurable intelligent surface, one or more reconfigurable intelligent surface elements for reflecting signaling between at least one of a base station and first UE via a first communication link, or the first UE and a second UE via a second communication link. The communications manager 1020 may be configured as or otherwise support a means for transmitting a capability information message on at least one of the first communication link or the second communication link, the capability information message including an indication that the first reconfigurable intelligent surface is capable of communicating with a second reconfigurable intelligent surface via at least one of the first communication link or the second communication link. The communications manager 1020 may be configured as or otherwise support a means for transmitting a beam information message to the second reconfigurable intelligent surface based on the capability information message via at least one of the first communication link or the second communication link, the beam information message including at least one of one or more phase values, one or more amplitude values, or one or more codebook weight values associated with the one or more reconfigurable intelligent surface elements.

By including or configuring the communications manager 1020 in accordance with examples as described herein, the device 1005 may support techniques for RISs communicating with each other and participating in network communications, which may result in more efficient beam forming, beam refinement, and beam acquisition procedures, more efficient use of computational resources, decreased latency, extended coverage for one or more devices, increased throughput, and improved user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of network communications between RISs as described herein, or the processor 1040 and the memory 1030 may be otherwise configured to perform or support such operations.

Figure 11:
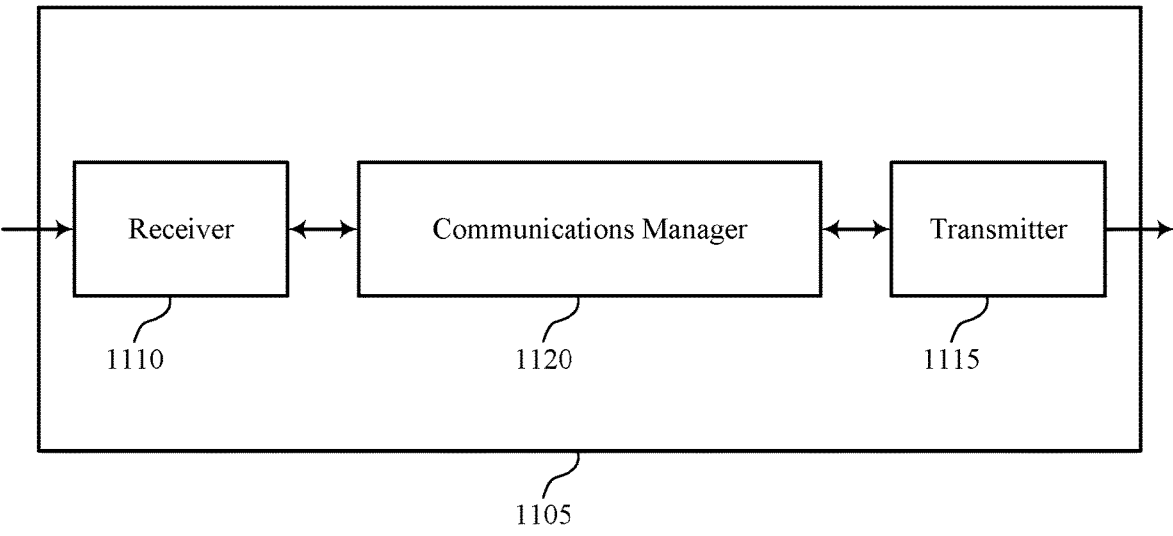
FIGS. 11 and 12 show block diagrams of devices that support network communications between RISs in accordance with aspects of the present disclosure.

FIG. 11 shows a block diagram 1100 of a device 1105 that supports network communications between RISs in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to network communications between RISs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to network communications between RISs). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of network communications between RISs as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a first reconfigurable intelligent surface via a first communication link, configuration information for one or more reconfigurable intelligent surface elements for reflecting signaling between at least one of a base station and a first UE via a first communication link, or the first UE and a second UE via a second communication link. The communications manager 1120 may be configured as or otherwise support a means for receiving, from the first UE, a capability information message on at least one of the first communication link or the second communication link, the capability information message including an indication that the first reconfigurable intelligent surface is capable of communicating with the second reconfigurable intelligent surface via at least one of the first communication link or the second communication link. The communications manager 1120 may be configured as or otherwise support a means for communicating with at least one of the first UE, the second UE, or a second base station, via the first reconfigurable intelligent surface or the second reconfigurable intelligent surface, based on receiving the capability information message.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for RISs communicating with each other and participating in network communications, which may result in more efficient beam forming, beam refinement, and beam acquisition procedures, more efficient use of computational resources, decreased latency, extended coverage for one or more devices, increased throughput, and improved user experience.

Figure 12:
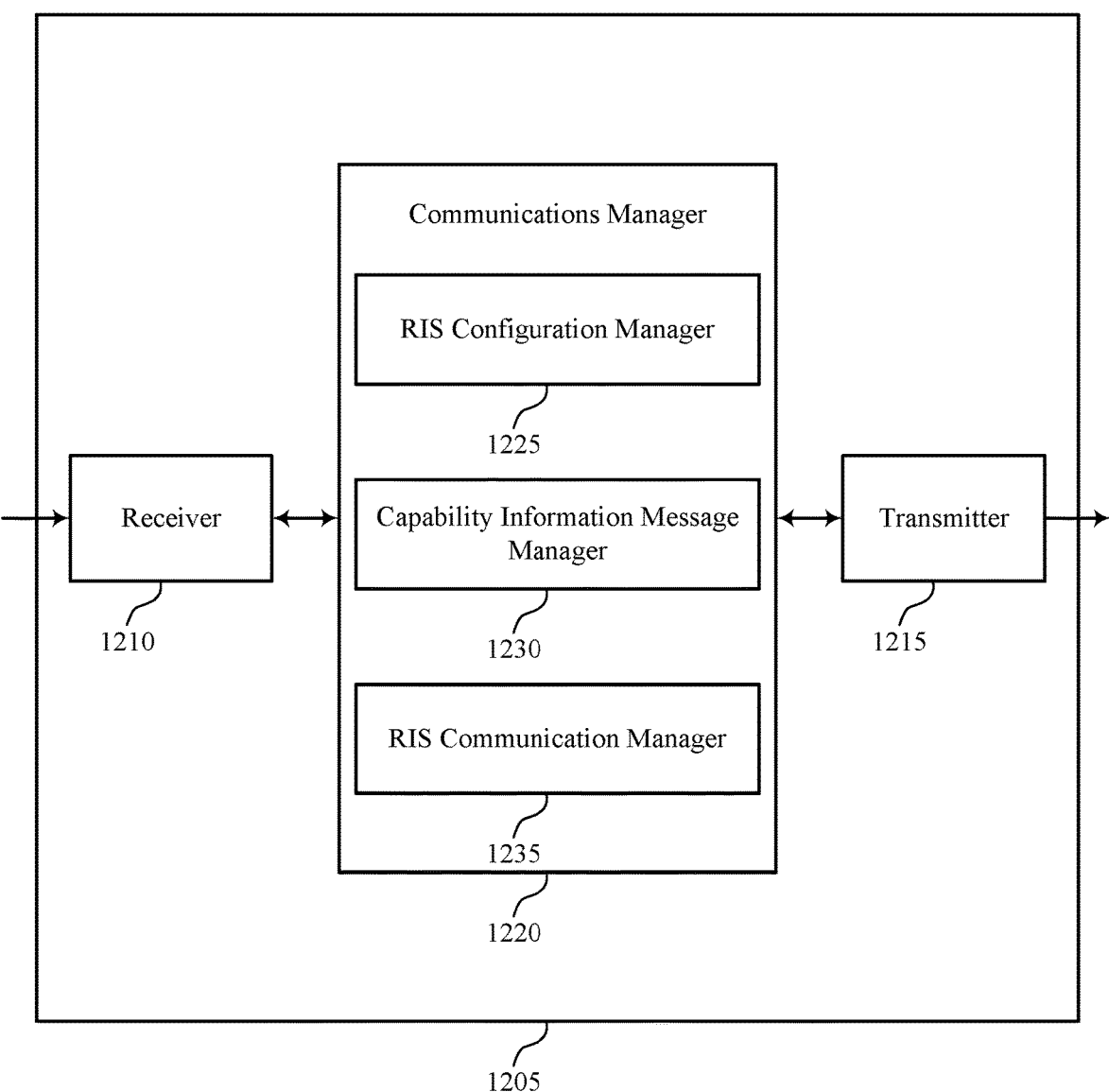

FIG. 12 shows a block diagram 1200 of a device 1205 that supports network communications between RISs in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to network communications between RISs). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to network communications between RISs). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of network communications between RISs as described herein. For example, the communications manager 1220 may include a RIS configuration manager 1225, a capability information message manager 1230, a RIS communication manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The RIS configuration manager 1225 may be configured as or otherwise support a means for transmitting, to a first reconfigurable intelligent surface via a first communication link, configuration information for one or more reconfigurable intelligent surface elements for reflecting signaling between at least one of a base station and a first UE via a first communication link, or the first UE and a second UE via a second communication link. The capability information message manager 1230 may be configured as or otherwise support a means for receiving, from the first UE, a capability information message on at least one of the first communication link or the second communication link, the capability information message including an indication that the first reconfigurable intelligent surface is capable of communicating with the second reconfigurable intelligent surface via at least one of the first communication link or the second communication link. The RIS communication manager 1235 may be configured as or otherwise support a means for communicating with at least one of the first UE, the second UE, or a second base station, via the first reconfigurable intelligent surface or the second reconfigurable intelligent surface, based on receiving the capability information message.

Figure 13:
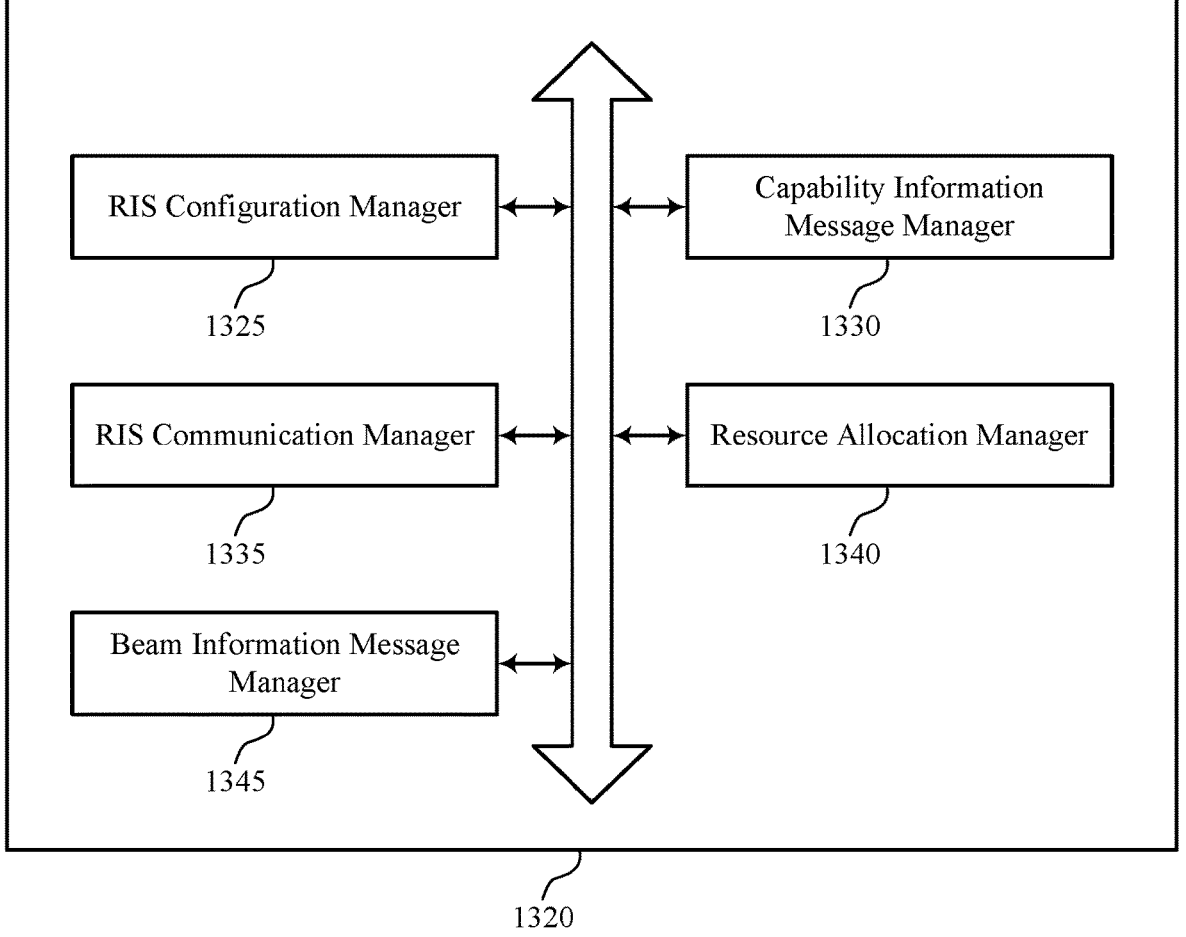
FIG. 13 shows a block diagram of a communications manager that supports network communications between RISs in accordance with aspects of the present disclosure.

FIG. 13 shows a block diagram 1300 of a communications manager 1320 that supports network communications between RISs in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of network communications between RISs as described herein. For example, the communications manager 1320 may include a RIS configuration manager 1325, a capability information message manager 1330, a RIS communication manager 1335, a resource allocation manager 1340, a beam information message manager 1345, or any combination thereof. Each of these components may communicate, directly or indirectly, with one another (e.g., via one or more buses).

The communications manager 1320 may support wireless communications at a base station in accordance with examples as disclosed herein. The RIS configuration manager 1325 may be configured as or otherwise support a means for transmitting, to a first reconfigurable intelligent surface via a first communication link, configuration information for one or more reconfigurable intelligent surface elements for reflecting signaling between at least one of a base station and a first UE via a first communication link, or the first UE and a second UE via a second communication link. The capability information message manager 1330 may be configured as or otherwise support a means for receiving, from the first UE, a capability information message on at least one of the first communication link or the second communication link, the capability information message including an indication that the first reconfigurable intelligent surface is capable of communicating with the second reconfigurable intelligent surface via at least one of the first communication link or the second communication link. The RIS communication manager 1335 may be configured as or otherwise support a means for communicating with at least one of the first UE, the second UE, or a second base station, via the first reconfigurable intelligent surface or the second reconfigurable intelligent surface, based on receiving the capability information message.

In some examples, the resource allocation manager 1340 may be configured as or otherwise support a means for transmitting, to the first reconfigurable intelligent surface, an allocation of resources on the first communication link, for transmitting a beam information message directly to the second reconfigurable intelligent surface, the beam information message including at least one of one or more phase values, one or more amplitude values, or one or more codebook weight values associated with the one or more reconfigurable intelligent surface elements.

In some examples, the resource allocation manager 1340 may be configured as or otherwise support a means for transmitting, to the first reconfigurable intelligent surface, an allocation of resources on the second communication link, for transmitting a beam information message directly to the second reconfigurable intelligent surface, the beam information message including at least one of one or more phase values, one or more amplitude values, or one or more codebook weight values associated with the one or more reconfigurable intelligent surface elements.

In some examples, the beam information message manager 1345 may be configured as or otherwise support a means for receiving, from the first reconfigurable intelligent surface via the first communication link, a beam information message, the beam information message including at least one of one or more phase values, one or more amplitude values, or one or more codebook weight values associated with the one or more reconfigurable intelligent surface elements. In some examples, the beam information message manager 1345 may be configured as or otherwise support a means for transmitting the beam information message to the second reconfigurable intelligent surface via the second communication link.

In some examples, the capability information message includes an indication that the first reconfigurable intelligent surface is capable of transmitting and receiving at least one of data messages, control messages, or feedback messages via at least one of the first communication link or the second communication link.

Figure 14:
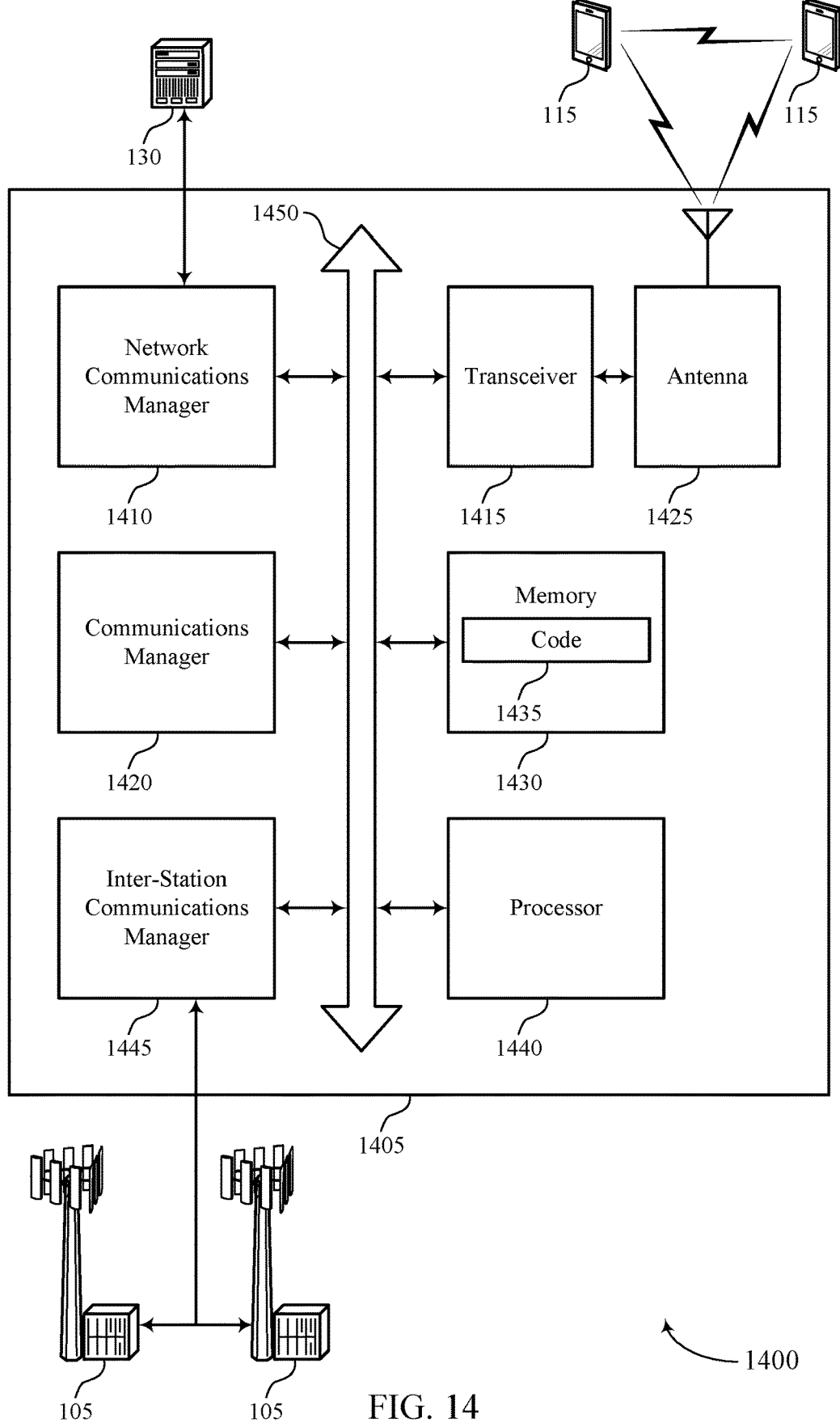
FIG. 14 shows a diagram of a system including a device that supports network communications between RISs in accordance with aspects of the present disclosure.

FIG. 14 shows a diagram of a system 1400 including a device 1405 that supports network communications between RISs in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting network communications between RISs). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a first reconfigurable intelligent surface via a first communication link, configuration information for one or more reconfigurable intelligent surface elements for reflecting signaling between at least one of a base station and a first UE via a first communication link, or the first UE and a second UE via a second communication link. The communications manager 1420 may be configured as or otherwise support a means for receiving, from the first UE, a capability information message on at least one of the first communication link or the second communication link, the capability information message including an indication that the first reconfigurable intelligent surface is capable of communicating with the second reconfigurable intelligent surface via at least one of the first communication link or the second communication link. The communications manager 1420 may be configured as or otherwise support a means for communicating with at least one of the first UE, the second UE, or a second base station, via the first reconfigurable intelligent surface or the second reconfigurable intelligent surface, based on receiving the capability information message.

By including or configuring the communications manager 1420 in accordance with examples as described herein, the device 1405 may support techniques for RISs communicating with each other and participating in network communications, which may result in more efficient beam forming, beam refinement, and beam acquisition procedures, more efficient use of computational resources, decreased latency, extended coverage for one or more devices, increased throughput, and improved user experience.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of network communications between RISs as described herein, or the processor 1440 and the memory 1430 may be otherwise configured to perform or support such operations.

Figure 15:
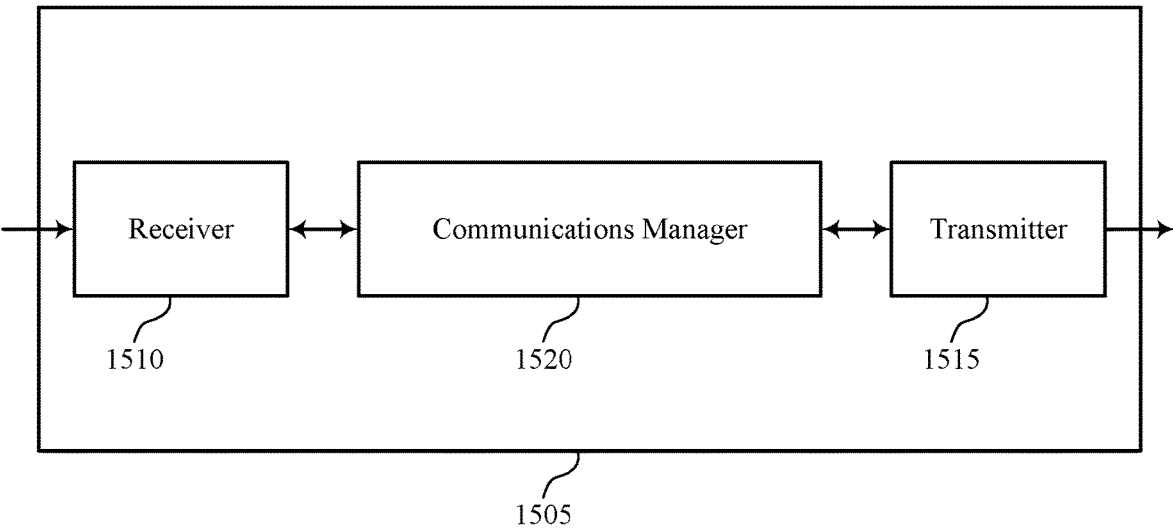
FIGS. 15 and 16 show block diagrams of devices that support network communications between RISs in accordance with aspects of the present disclosure.

FIG. 15 shows a block diagram 1500 of a device 1505 that supports network communications between RISs in accordance with aspects of the present disclosure. The device 1505 may be an example of aspects of a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to network communications between RISs). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to network communications between RISs). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of network communications between RISs as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a first UE in accordance with examples as disclosed herein. For example, the communications manager 1520 may be configured as or otherwise support a means for receiving, from a first reconfigurable intelligent surface, a capability information message on at least one of a first communication link or a second communication link, the capability information message including an indication that the first reconfigurable intelligent surface is capable of communicating with a second reconfigurable intelligent surface via at least one of the first communication link or the second communication link. The communications manager 1520 may be configured as or otherwise support a means for communicating with at least one of a base station, or the second UE, via the first reconfigurable intelligent surface or the second reconfigurable intelligent surface, based on receiving the capability information message.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for RISs communicating with each other and participating in network communications, which may result in more efficient beam forming, beam refinement, and beam acquisition procedures, more efficient use of computational resources, decreased latency, extended coverage for one or more devices, increased throughput, and improved user experience.

Figure 16:
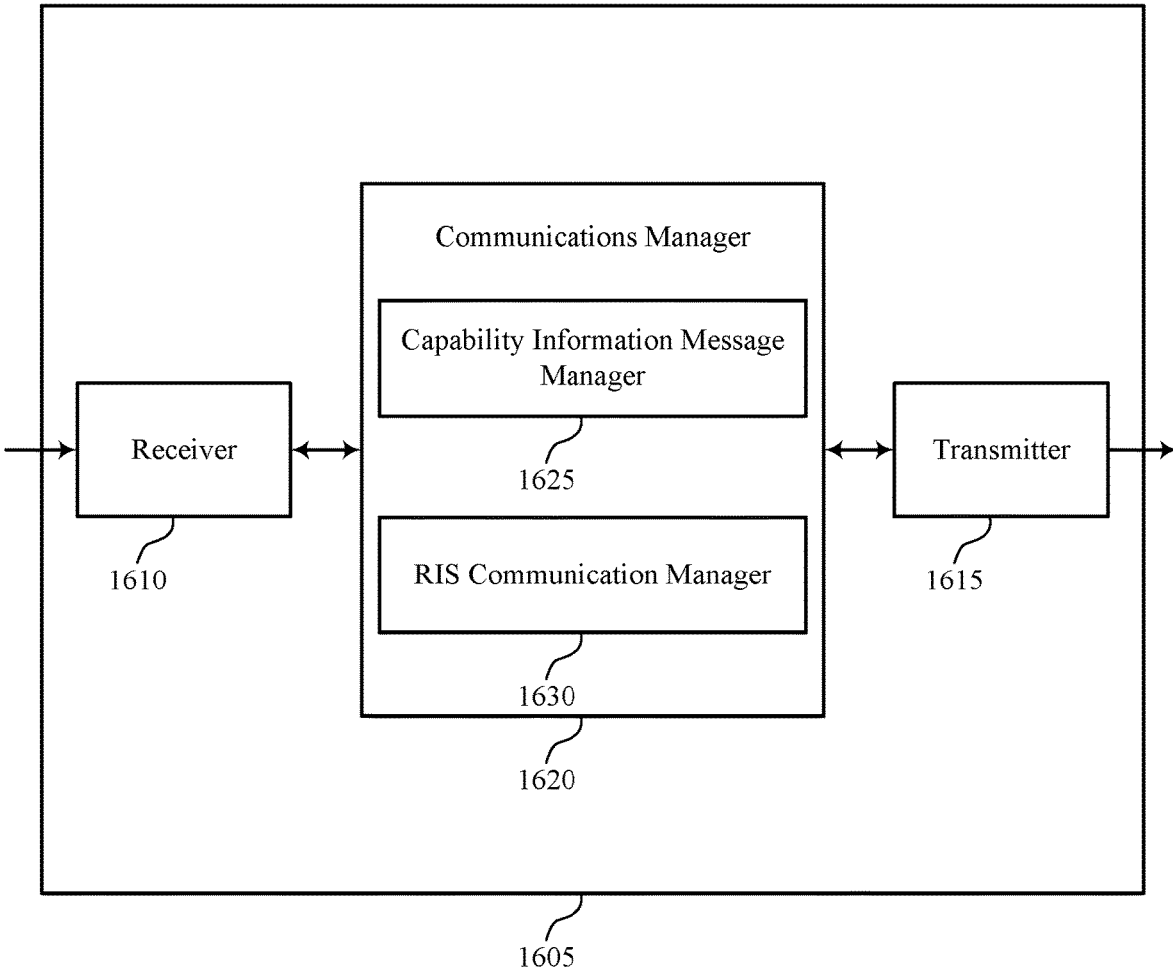

FIG. 16 shows a block diagram 1600 of a device 1605 that supports network communications between RISs in accordance with aspects of the present disclosure. The device 1605 may be an example of aspects of a device 1505 or a UE 115 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to network communications between RISs). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to network communications between RISs). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of network communications between RISs as described herein. For example, the communications manager 1620 may include a capability information message manager 1625 a RIS communication manager 1630, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communications at a first UE in accordance with examples as disclosed herein. The capability information message manager 1625 may be configured as or otherwise support a means for receiving, from a first reconfigurable intelligent surface, a capability information message on at least one of a first communication link or a second communication link, the capability information message including an indication that the first reconfigurable intelligent surface is capable of communicating with a second reconfigurable intelligent surface via at least one of the first communication link or the second communication link. The RIS communication manager 1630 may be configured as or otherwise support a means for communicating with at least one of a base station, or the second UE, via the first reconfigurable intelligent surface or the second reconfigurable intelligent surface, based on receiving the capability information message.

Figure 17:
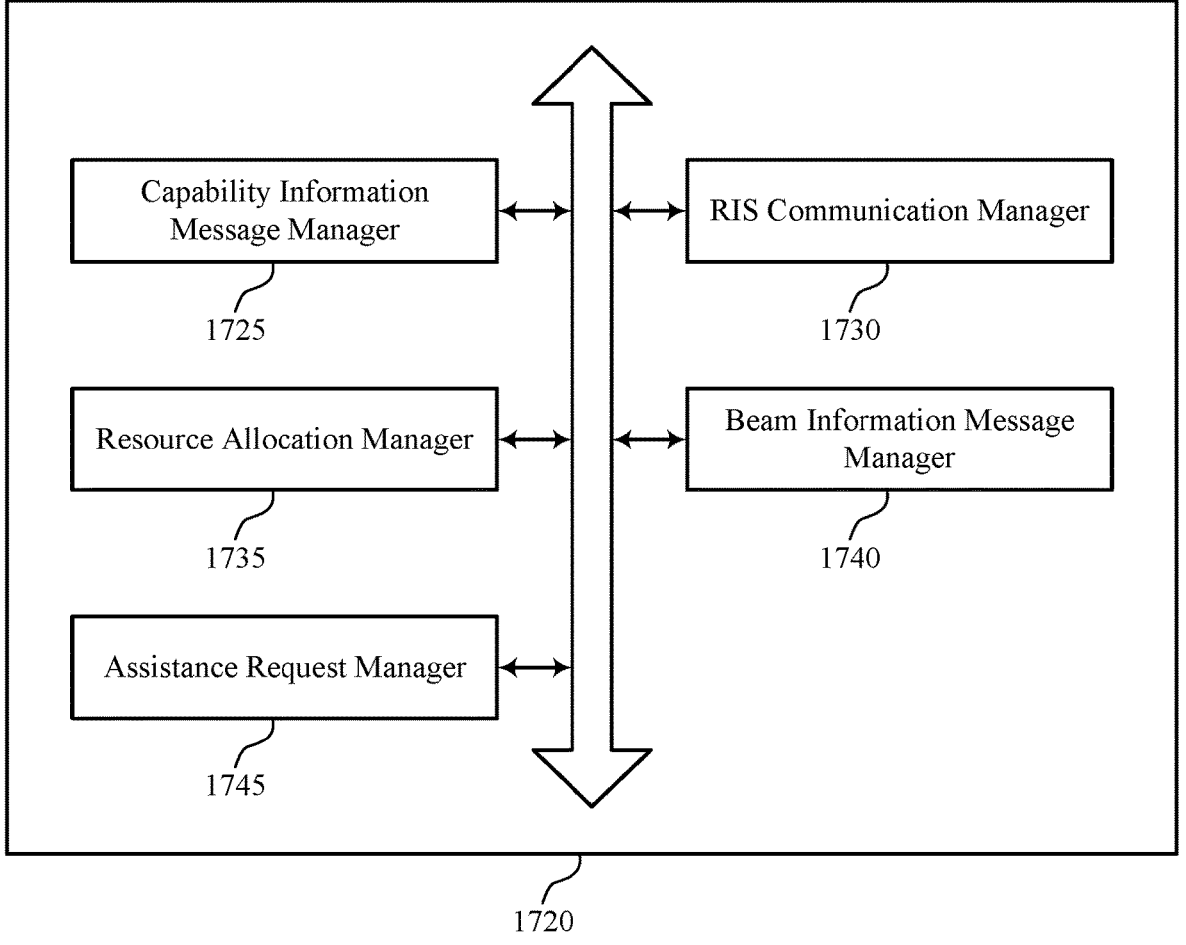
FIG. 17 shows a block diagram of a communications manager that supports network communications between RISs in accordance with aspects of the present disclosure.

FIG. 17 shows a block diagram 1700 of a communications manager 1720 that supports network communications between RISs in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of network communications between RISs as described herein. For example, the communications manager 1720 may include a capability information message manager 1725, a RIS communication manager 1730, a resource allocation manager 1735, a beam information message manager 1740, an assistance request manager 1745, or any combination thereof. Each of these components may communicate, directly or indirectly, with one another (e.g., via one or more buses).

The communications manager 1720 may support wireless communications at a first UE in accordance with examples as disclosed herein. The capability information message manager 1725 may be configured as or otherwise support a means for receiving, from a first reconfigurable intelligent surface, a capability information message on at least one of a first communication link or a second communication link, the capability information message including an indication that the first reconfigurable intelligent surface is capable of communicating with a second reconfigurable intelligent surface via at least one of the first communication link or the second communication link. The RIS communication manager 1730 may be configured as or otherwise support a means for communicating with at least one of a base station, or the second UE, via the first reconfigurable intelligent surface or the second reconfigurable intelligent surface, based on receiving the capability information message.

In some examples, the resource allocation manager 1735 may be configured as or otherwise support a means for transmitting, to the first reconfigurable intelligent surface, an allocation of resources on the second communication link for transmitting a beam information message directly to the second reconfigurable intelligent surface, where the capability information message including an indication that the first reconfigurable intelligent surface is capable of communicating with the second reconfigurable intelligent surface via at least one of the first communication link or the second communication link.

In some examples, the capability information message includes a request for assistance in identifying resources on the second communication link. In some examples, transmitting the allocation of resources on the second communication link is based on receiving the capability information message.

In some examples, the beam information message manager 1740 may be configured as or otherwise support a means for receiving, from the first reconfigurable intelligent surface via the second communication link, a beam information message, the beam information message including at least one of one or more phase values, one or more amplitude values, or one or more codebook weight values associated with the one or more reconfigurable intelligent surface elements. In some examples, the beam information message manager 1740 may be configured as or otherwise support a means for transmitting the beam information message to the second reconfigurable intelligent surface via the second communication link.

In some examples, the capability information message includes an indication that the first reconfigurable intelligent surface is capable of transmitting and receiving at least one of data messages, control messages, or feedback messages via at least one of the first communication link or the second communication link.

Figure 18:
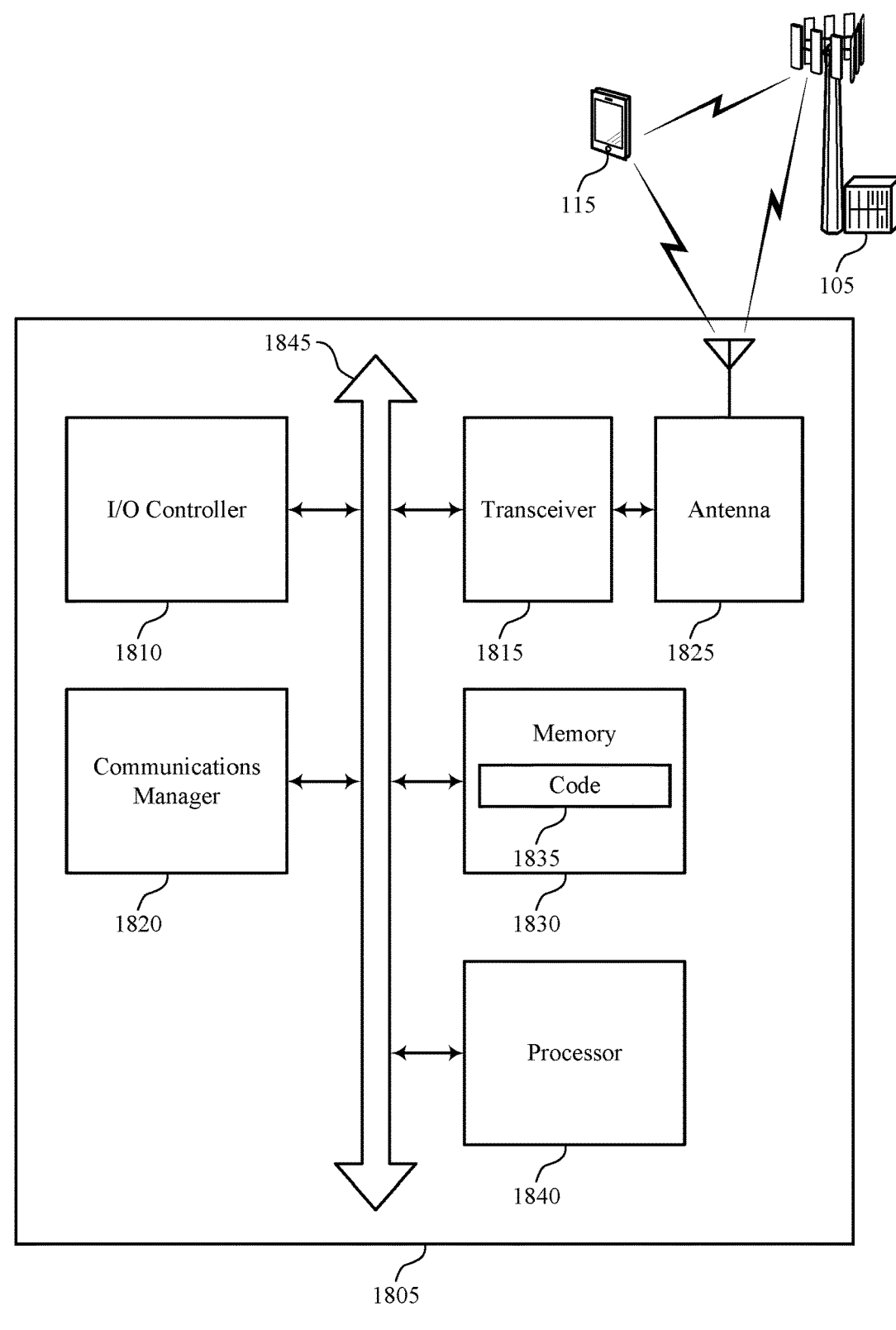
FIG. 18 shows a diagram of a system including a device that supports network communications between RISs in accordance with aspects of the present disclosure.

FIG. 18 shows a diagram of a system 1800 including a device 1805 that supports network communications between RISs in accordance with aspects of the present disclosure. The device 1805 may be an example of or include the components of a device 1505, a device 1605, or a UE 115 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, an input/output (I/O) controller 1810, a transceiver 1815, an antenna 1825, a memory 1830, code 1835, and a processor 1840. These components may be in electronic communication or otherwise coupled (e.g., operatively, communicatively, functionally, electronically, electrically) via one or more buses (e.g., a bus 1845).

The I/O controller 1810 may manage input and output signals for the device 1805. The I/O controller 1810 may also manage peripherals not integrated into the device 1805. In some cases, the I/O controller 1810 may represent a physical connection or port to an external peripheral. In some cases, the I/O controller 1810 may utilize an operating system such as iOS®, ANDROID®, MS-DOS®, MS-WINDOWS®, OS/2®, UNIX®, LINUX®, or another known operating system. Additionally, or alternatively, the I/O controller 1810 may represent or interact with a modem, a keyboard, a mouse, a touchscreen, or a similar device. In some cases, the I/O controller 1810 may be implemented as part of a processor, such as the processor 1840. In some cases, a user may interact with the device 1805 via the I/O controller 1810 or via hardware components controlled by the I/O controller 1810.

In some cases, the device 1805 may include a single antenna 1825. However, in some other cases, the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include random access memory (RAM) and read-only memory (ROM). The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a basic I/O system (BIOS) which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting network communications between RISs). For example, the device 1805 or a component of the device 1805 may include a processor 1840 and memory 1830 coupled to the processor 1840, the processor 1840 and memory 1830 configured to perform various functions described herein.

The communications manager 1820 may support wireless communications at a first UE in accordance with examples as disclosed herein. For example, the communications manager 1820 may be configured as or otherwise support a means for receiving, from a first reconfigurable intelligent surface, a capability information message on at least one of a first communication link or a second communication link, the capability information message including an indication that the first reconfigurable intelligent surface is capable of communicating with a second reconfigurable intelligent surface via at least one of the first communication link or the second communication link. The communications manager 1820 may be configured as or otherwise support a means for communicating with at least one of a base station, or the second UE, via the first reconfigurable intelligent surface or the second reconfigurable intelligent surface, based on receiving the capability information message.

By including or configuring the communications manager 1820 in accordance with examples as described herein, the device 1805 may support techniques for RISs communicating with each other and participating in network communications, which may result in more efficient beam forming, beam refinement, and beam acquisition procedures, more efficient use of computational resources, decreased latency, extended coverage for one or more devices, increased throughput, and improved user experience.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of network communications between RISs as described herein, or the processor 1840 and the memory 1830 may be otherwise configured to perform or support such operations.

FIG. 19 shows a flowchart illustrating a method 1900 that supports network communications between reconfigurable intelligent surfaces in accordance with aspects of the present disclosure. The operations of the method 1900 may be implemented by a base station or its components as described herein. For example, the operations of the method 1900 may be performed by a base station 105 as described with reference to FIGS. 1 through 10. In some examples, a base station may execute a set of instructions to control the functional elements of the base station to perform the described functions. Additionally, or alternatively, the base station may perform aspects of the described functions using special-purpose hardware.

At 1905, the method may include configuring, by a controller of the first reconfigurable intelligent surface, one or more reconfigurable intelligent surface elements for reflecting signaling between at least one of a base station and first UE via a first communication link, or the first UE and a second UE via a second communication link. The operations of 1905 may be performed in accordance with examples as disclosed herein. In some examples, aspects of the operations of 1905 may be performed by a RIS element manager 925 as described with reference to FIG. 9.

At 1910, the method may include transmitting a capability information message on at least one of the first communication link or the second communication link, the capability information message including an indication that the first reconfigurable intelligent surface is capable of communicating with a second reconfigurable intelligent surface via at least one of the first communication link or the second communication link. The operations of 1910 may be performed in accordance with examples as disclosed herein. In some examples, aspects of the operations of 1910 may be performed by a capability information message manager 930 as described with reference to FIG. 9.

At 1915, the method may include transmitting a beam information message to the second reconfigurable intelligent surface based on the capability information message via at least one of the first communication link or the second communication link, the beam information message including at least one of one or more phase values, one or more amplitude values, or one or more codebook weight values associated with the one or more reconfigurable intelligent surface elements. The operations of 1915 may be performed in accordance with examples as disclosed herein. In some examples, aspects of the operations of 1915 may be performed by a beam information message manager 935 as described with reference to FIG. 9.

FIG. 20 shows a flowchart illustrating a method 2000 that supports network communications between reconfigurable intelligent surfaces in accordance with aspects of the present disclosure. The operations of the method 2000 may be implemented by a base Station or its components as described herein. For example, the operations of the method 2000 may be performed by a base Station 105 as described with reference to FIGS. 1 through 6 and 11 through 14. In some examples, a base Station may execute a set of instructions to control the functional elements of the base Station to perform the described functions. Additionally, or alternatively, the base Station may perform aspects of the described functions using special-purpose hardware.

At 2005, the method may include transmitting, to a first reconfigurable intelligent surface via a first communication link, configuration information for one or more reconfigurable intelligent surface elements for reflecting signaling between at least one of a base station and a first UE via a first communication link, or the first UE and a second UE via a second communication link. The operations of 2005 may be performed in accordance with examples as disclosed herein. In some examples, aspects of the operations of 2005 may be performed by a RIS configuration manager 1325 as described with reference to FIG. 13.

At 2010, the method may include receiving, from the first UE, a capability information message on at least one of the first communication link or the second communication link, the capability information message including an indication that the first reconfigurable intelligent surface is capable of communicating with the second reconfigurable intelligent surface via at least one of the first communication link or the second communication link. The operations of 2010 may be performed in accordance with examples as disclosed herein. In some examples, aspects of the operations of 2010 may be performed by a capability information message manager 1330 as described with reference to FIG. 13.

At 2015, the method may include communicating with at least one of the first UE, the second UE, or a second base station, via the first reconfigurable intelligent surface or the second reconfigurable intelligent surface, based on receiving the capability information message. The operations of 2015 may be performed in accordance with examples as disclosed herein. In some examples, aspects of the operations of 2015 may be performed by a RIS communication manager 1335 as described with reference to FIG. 13.

FIG. 21 shows a flowchart illustrating a method 2100 that supports network communications between reconfigurable intelligent surfaces in accordance with aspects of the present disclosure. The operations of the method 2100 may be implemented by a UE or its components as described herein. For example, the operations of the method 2100 may be performed by a UE 115 as described with reference to FIGS. 1 through 6 and 15 through 18. In some examples, a UE may execute a set of instructions to control the functional elements of the UE to perform the described functions. Additionally, or alternatively, the UE may perform aspects of the described functions using special-purpose hardware.

At 2105, the method may include receiving, from a first reconfigurable intelligent surface, a capability information message on at least one of a first communication link or a second communication link, the capability information message including an indication that the first reconfigurable intelligent surface is capable of communicating with a second reconfigurable intelligent surface via at least one of the first communication link or the second communication link. The operations of 2105 may be performed in accordance with examples as disclosed herein. In some examples, aspects of the operations of 2105 may be performed by a capability information message manager 1725 as described with reference to FIG. 17.

At 2110, the method may include communicating with at least one of a base station, or the second UE, via the first reconfigurable intelligent surface or the second reconfigurable intelligent surface, based on receiving the capability information message. The operations of 2110 may be performed in accordance with examples as disclosed herein. In some examples, aspects of the operations of 2110 may be performed by a RIS communication manager 1730 as described with reference to FIG. 17.

Aspect 1: A method for wireless communications at a first reconfigurable intelligent surface, comprising: configuring, by a controller of the first reconfigurable intelligent surface, one or more reconfigurable intelligent surface elements for reflecting signaling between at least one of a base station and first UE via a first communication link, or the first UE and a second UE via a second communication link; transmitting a capability information message on at least one of the first communication link or the second communication link, the capability information message comprising an indication that the first reconfigurable intelligent surface is capable of communicating with a second reconfigurable intelligent surface via at least one of the first communication link or the second communication link; and transmitting a beam information message to the second reconfigurable intelligent surface based at least in part on the capability information message via at least one of the first communication link or the second communication link, the beam information message comprising at least one of one or more phase values, one or more amplitude values, or one or more codebook weight values associated with the one or more reconfigurable intelligent surface elements.

Aspect 2: The method of aspect 1, further comprising: including, in the beam information message, at least one of an identifier for the first reconfigurable intelligent surface, or an identifier for the second reconfigurable intelligent surface.

Aspect 3: The method of aspect 2, further comprising: including, in the beam information message, at least one of an identifier for the base station, an identifier for the first UE, an identifier for the second UE, an indication of a pairing of the base station and the UE, or an indication of a pairing between the first UE and the second UE.

Aspect 4: The method of any of aspects 1 through 3, further comprising: including, in the capability information message, an indication that the first reconfigurable intelligent surface is capable of transmitting and receiving at least one of data messages, control messages, or feedback messages via at least one of the first communication link or the second communication link.

Aspect 5: The method of any of aspects 1 through 4, further comprising: including, in the capability information message, an indication that the first reconfigurable intelligent surface is capable of autonomously identifying resources on the second communication link.

Aspect 6: The method of any of aspects 1 through 5, further comprising: including, in the capability information message, a request for assistance in identifying resources on the second communication link.

Aspect 7: The method of any of aspects 1 through 6, further comprising: receiving, from the base station, an allocation of resources on the first communication link, wherein the beam information message is transmitted directly to the second reconfigurable intelligent surface via the allocated resources on the first communication link.

Aspect 8: The method of any of aspects 1 through 7, further comprising: receiving, from the first UE, an allocation of resources on the second communication link, wherein the beam information message is transmitted directly to the second reconfigurable intelligent surface via the allocated resources on the second communication link.

Aspect 9: The method of any of aspects 1 through 8, further comprising: sensing, by the first reconfigurable intelligent surface, one or more resources on the second communication link, wherein the beam information message is transmitted directly to the second reconfigurable intelligent surface via the sensed one or more resources on the second communication link.

Aspect 10: The method of any of aspects 1 through 9, wherein transmitting the beam information message comprises: transmitting the beam information message to the second reconfigurable intelligent surface via the base station on the first communication link.

Aspect 11: The method of any of aspects 1 through 10, wherein transmitting the beam information message comprises: determining resources on the second communication link for transmitting the beam information message to the first UE or the second UE; and transmitting the beam information message to the second reconfigurable intelligent surface via the first UE or the second UE on the determined resources on the second communication link.

Aspect 12: The method of aspect 11, wherein determining the resources on the second communication link comprises: receiving, from at least one of the base station, the first UE, or the second UE, an allocation of the resources on the second communication link.

Aspect 13: The method of any of aspects 11 through 12, wherein determining the resources on the second communication link comprises: autonomously sensing the resources on the second communication link.

Aspect 14: The method of any of aspects 1 through 13, further comprising: receiving, from the second reconfigurable intelligent surface, a request for the beam information message, wherein transmitting the beam information message is based at least in part on the request.

Aspect 15: The method of aspect 14, wherein the request comprises an indication of beam information for at least one of a base station or a UE.

Aspect 16: The method of any of aspects 1 through 15, wherein configuring the one or more reconfigurable intelligent surface elements comprises: performing a beam refinement procedure with at least one of the base station, the first UE, or the second UE, wherein determining the beam information message is based at least in part on the beam refinement procedure.

Aspect 17: The method of any of aspects 1 through 16, wherein the first communication link comprises a cellular link; and the second communication link comprises a sidelink.

Aspect 18: A method for wireless communications at a base station, comprising: transmitting, to a first reconfigurable intelligent surface via a first communication link, configuration information for one or more reconfigurable intelligent surface elements for reflecting signaling between at least one of a base station and a first UE via a first communication link, or the first UE and a second UE via a second communication link; receiving, from the first UE, a capability information message on at least one of the first communication link or the second communication link, the capability information message comprising an indication that the first reconfigurable intelligent surface is capable of communicating with the second reconfigurable intelligent surface via at least one of the first communication link or the second communication link; and communicating with at least one of the first UE, the second UE, or a second base station, via the first reconfigurable intelligent surface or the second reconfigurable intelligent surface, based at least in part on receiving the capability information message.

Aspect 19: The method of aspect 18, further comprising: transmitting, to the first reconfigurable intelligent surface, an allocation of resources on the first communication link, for transmitting a beam information message directly to the second reconfigurable intelligent surface, the beam information message comprising at least one of one or more phase values, one or more amplitude values, or one or more codebook weight values associated with the one or more reconfigurable intelligent surface elements.

Aspect 20: The method of any of aspects 18 through 19, further comprising: transmitting, to the first reconfigurable intelligent surface, an allocation of resources on the second communication link, for transmitting a beam information message directly to the second reconfigurable intelligent surface, the beam information message comprising at least one of one or more phase values, one or more amplitude values, or one or more codebook weight values associated with the one or more reconfigurable intelligent surface elements.

Aspect 21: The method of any of aspects 18 through 20, further comprising: receiving, from the first reconfigurable intelligent surface via the first communication link, a beam information message, the beam information message comprising at least one of one or more phase values, one or more amplitude values, or one or more codebook weight values associated with the one or more reconfigurable intelligent surface elements; and transmitting the beam information message to the second reconfigurable intelligent surface via the second communication link.

Aspect 22: The method of any of aspects 18 through 21, wherein the capability information message comprises an indication that the first reconfigurable intelligent surface is capable of transmitting and receiving at least one of data messages, control messages, or feedback messages via at least one of the first communication link or the second communication link.

Aspect 23: A method for wireless communications at a first UE, comprising: receiving, from a first reconfigurable intelligent surface, a capability information message on at least one of a first communication link or a second communication link, the capability information message comprising an indication that the first reconfigurable intelligent surface is capable of communicating with a second reconfigurable intelligent surface via at least one of the first communication link or the second communication link; and communicating with at least one of a base station, or the second UE, via the first reconfigurable intelligent surface or the second reconfigurable intelligent surface, based at least in part on receiving the capability information message.

Aspect 24: The method of aspect 23, further comprising: transmitting, to the first reconfigurable intelligent surface, an allocation of resources on the second communication link for transmitting a beam information message directly to the second reconfigurable intelligent surface, wherein the capability information message comprising an indication that the first reconfigurable intelligent surface is capable of communicating with the second reconfigurable intelligent surface via at least one of the first communication link or the second communication link.

Aspect 25: The method of aspect 24, wherein the capability information message comprises a request for assistance in identifying resources on the second communication link; and transmitting the allocation of resources on the second communication link is based at least in part on receiving the capability information message.

Aspect 26: The method of any of aspects 23 through 25, further comprising: receiving, from the first reconfigurable intelligent surface via the second communication link, a beam information message, the beam information message comprising at least one of one or more phase values, one or more amplitude values, or one or more codebook weight values associated with the one or more reconfigurable intelligent surface elements; and transmitting the beam information message to the second reconfigurable intelligent surface via the second communication link.

Aspect 27: The method of any of aspects 23 through 26, wherein the capability information message comprises an indication that the first reconfigurable intelligent surface is capable of transmitting and receiving at least one of data messages, control messages, or feedback messages via at least one of the first communication link or the second communication link.

Aspect 28: An apparatus for wireless communications at a first reconfigurable intelligent surface, comprising a processor; memory coupled with the processor; and instructions stored in the memory and executable by the processor to cause the apparatus to perform a method of any of aspects 1 through 17.

Aspect 29: An apparatus for wireless communications at a first reconfigurable intelligent surface, comprising at least one means for performing a method of any of aspects 1 through 17.

Aspect 30: A non-transitory computer-readable medium storing code for wireless communications at a first reconfigurable intelligent surface, the code comprising instructions executable by a processor to perform a method of any of aspects 1 through 17.

Aspect 31: An apparatus for wireless communications at a base station, comprising a processor; memory coupled with the processor; and instructions stored in the memory and executable by the processor to cause the apparatus to perform a method of any of aspects 18 through 22.

Aspect 32: An apparatus for wireless communications at a base station, comprising at least one means for performing a method of any of aspects 18 through 22.

Aspect 33: A non-transitory computer-readable medium storing code for wireless communications at a base station, the code comprising instructions executable by a processor to perform a method of any of aspects 18 through 22.

Aspect 34: An apparatus for wireless communications at a first UE, comprising a processor; memory coupled with the processor; and instructions stored in the memory and executable by the processor to cause the apparatus to perform a method of any of aspects 23 through 27.

Aspect 35: An apparatus for wireless communications at a first UE, comprising at least one means for performing a method of any of aspects 23 through 27.

Aspect 36: A non-transitory computer-readable medium storing code for wireless communications at a first UE, the code comprising instructions executable by a processor to perform a method of any of aspects 23 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first reconfigurable intelligent surface, comprising:
   configuring, by a controller of the first reconfigurable intelligent surface, one or more reconfigurable intelligent surface elements for reflecting signaling between at least one of a base station and first user equipment (UE) via a first communication link, or the first UE and a second UE via a second communication link;
   transmitting a capability information message on at least one of the first communication link or the second communication link, the capability information message comprising an indication that the first reconfigurable intelligent surface is capable of communicating with a second reconfigurable intelligent surface via at least one of the first communication link or the second communication link; and
   transmitting a beam information message to the second reconfigurable intelligent surface based at least in part on the capability information message via at least one of the first communication link or the second communication link, the beam information message comprising at least one of one or more phase values, one or more amplitude values, or one or more codebook weight values associated with the one or more reconfigurable intelligent surface elements.

2. The method of claim 1, further comprising:
   including, in the beam information message, at least one of an identifier for the first reconfigurable intelligent surface, or an identifier for the second reconfigurable intelligent surface.

3. The method of claim 2, further comprising:
   including, in the beam information message, at least one of an identifier for the base station, an identifier for the first UE, an identifier for the second UE, an indication of a pairing of the base station and the UE, or an indication of a pairing between the first UE and the second UE.

4. The method of claim 1, further comprising:
   including, in the capability information message, an indication that the first reconfigurable intelligent surface is capable of transmitting and receiving at least one of data messages, control messages, or feedback messages via at least one of the first communication link or the second communication link.

5. The method of claim 1, further comprising:
   including, in the capability information message, an indication that the first reconfigurable intelligent surface is capable of autonomously identifying resources on the second communication link.

6. The method of claim 1, further comprising:
   including, in the capability information message, a request for assistance in identifying resources on the second communication link.

7. The method of claim 1, further comprising:
   receiving, from the base station, an allocation of resources on the first communication link, wherein the beam information message is transmitted directly to the second reconfigurable intelligent surface via the allocated resources on the first communication link.

8. The method of claim 1, further comprising:
   receiving, from the first UE, an allocation of resources on the second communication link, wherein the beam information message is transmitted directly to the second reconfigurable intelligent surface via the allocated resources on the second communication link.

9. The method of claim 1, further comprising:
   sensing, by the first reconfigurable intelligent surface, one or more resources on the second communication link, wherein the beam information message is transmitted directly to the second reconfigurable intelligent surface via the sensed one or more resources on the second communication link.

10. The method of claim 1, wherein transmitting the beam information message comprises:
    transmitting the beam information message to the second reconfigurable intelligent surface via the base station on the first communication link.

11. The method of claim 1, wherein transmitting the beam information message comprises:
    determining resources on the second communication link for transmitting the beam information message to the first UE or the second UE; and
    transmitting the beam information message to the second reconfigurable intelligent surface via the first UE or the second UE on the determined resources on the second communication link.

12. The method of claim 11, wherein determining the resources on the second communication link comprises:
    receiving, from at least one of the base station, the first UE, or the second UE, an allocation of the resources on the second communication link.

13. The method of claim 11, wherein determining the resources on the second communication link comprises:
    autonomously sensing the resources on the second communication link.

14. The method of claim 1, further comprising:
    receiving, from the second reconfigurable intelligent surface, a request for the beam information message, wherein transmitting the beam information message is based at least in part on the request.

15. The method of claim 14, wherein the request comprises an indication of beam information for at least one of a base station or a UE.

16. The method of claim 1, wherein configuring the one or more reconfigurable intelligent surface elements comprises:

performing a beam refinement procedure with at least one of the base station, the first UE, or the second UE, wherein determining the beam information message is based at least in part on the beam refinement procedure.

17. The method of claim 1, wherein:

the first communication link comprises a cellular link; and the second communication link comprises a sidelink.

18. A method for wireless communications at a base station, comprising:

transmitting, to a first reconfigurable intelligent surface via a first communication link, configuration information for one or more reconfigurable intelligent surface elements for reflecting signaling between at least one of a base station and a first user equipment (UE) via a first communication link, or the first UE and a second UE via a second communication link;

receiving a capability information message on at least one of the first communication link or the second communication link, the capability information message comprising an indication that the first reconfigurable intelligent surface is capable of communicating with a second reconfigurable intelligent surface via at least one of the first communication link or the second communication link; and communicating with at least one of the first UE, the second UE, or a second base station, via the first reconfigurable intelligent surface or the second reconfigurable intelligent surface, based at least in part on receiving the capability information message.

19. The method of claim 18, further comprising:

transmitting, to the first reconfigurable intelligent surface, an allocation of resources on the first communication link, for transmitting a beam information message directly to the second reconfigurable intelligent surface, the beam information message comprising at least one of one or more phase values, one or more amplitude values, or one or more codebook weight values associated with the one or more reconfigurable intelligent surface elements.

20. The method of claim 18, further comprising:

transmitting, to the first reconfigurable intelligent surface, an allocation of resources on the second communication link, for transmitting a beam information message directly to the second reconfigurable intelligent surface, the beam information message comprising at least one of one or more phase values, one or more amplitude values, or one or more codebook weight values associated with the one or more reconfigurable intelligent surface elements.

21. The method of claim 18, further comprising:

receiving, from the first reconfigurable intelligent surface via the first communication link, a beam information message, the beam information message comprising at least one of one or more phase values, one or more amplitude values, or one or more codebook weight values associated with the one or more reconfigurable intelligent surface elements; and transmitting the beam information message to the second reconfigurable intelligent surface via the second communication link.

22. The method of claim 18, wherein the capability information message comprises an indication that the first reconfigurable intelligent surface is capable of transmitting and receiving at least one of data messages, control messages, or feedback messages via at least one of the first communication link or the second communication link.

23. A method for wireless communications at a first user equipment (UE), comprising:

receiving, from a first reconfigurable intelligent surface, a capability information message on at least one of a first communication link or a second communication link, the capability information message comprising an indication that the first reconfigurable intelligent surface is capable of communicating with a second reconfigurable intelligent surface via at least one of the first communication link or the second communication link; and communicating with at least one of a base station, or a second UE, via the first reconfigurable intelligent surface or the second reconfigurable intelligent surface, based at least in part on receiving the capability information message.

24. The method of claim 23, further comprising:

transmitting, to the first reconfigurable intelligent surface, an allocation of resources on the second communication link for transmitting a beam information message directly to the second reconfigurable intelligent surface, wherein the capability information message comprising an indication that the first reconfigurable intelligent surface is capable of communicating with the second reconfigurable intelligent surface via at least one of the first communication link or the second communication link.

25. The method of claim 24, wherein:

the capability information message comprises a request for assistance in identifying resources on the second communication link; and transmitting the allocation of resources on the second communication link is based at least in part on receiving the capability information message.

26. The method of claim 23, further comprising:

receiving, from the first reconfigurable intelligent surface via the second communication link, a beam information message, the beam information message comprising at least one of one or more phase values, one or more amplitude values, or one or more codebook weight values associated with one or more reconfigurable intelligent surface elements; and transmitting the beam information message to the second reconfigurable intelligent surface via the second communication link.

27. The method of claim 23, wherein the capability information message comprises an indication that the first reconfigurable intelligent surface is capable of transmitting and receiving at least one of data messages, control messages, or feedback messages via at least one of the first communication link or the second communication link.

28. An apparatus for wireless communications at a first reconfigurable intelligent surface, comprising:

a processor;

memory coupled with the processor; and instructions stored in the memory and executable by the processor to cause the apparatus to:

configuring, by a controller of the first reconfigurable intelligent surface, one or more reconfigurable intelligent surface elements for reflect signaling between at least one of a base station and first user equipment (UE) via a first communication link, or the first UE and a second UE via a second communication link;

transmit a capability information message on at least one of the first communication link or the second communication link, the capability information message comprising an indication that the first reconfigurable intelligent surface is capable of communicating with a second reconfigurable intelligent surface via at least one of the first communication link or the second communication link; and transmit a beam information message to the second reconfigurable intelligent surface based at least in part on the capability information message via at least one of the first communication link or the second communication link, the beam information message comprising at least one of one or more phase values, one or more amplitude values, or one or more codebook weight values associated with the one or more reconfigurable intelligent surface elements.

29. The apparatus of claim 28, wherein the instructions are further executable by the processor to cause the apparatus to:

include, in the beam information message, at least one of an identifier for the first reconfigurable intelligent surface, or an identifier for the second reconfigurable intelligent surface, an identifier for the base station, an identifier for the first UE, an identifier for the second UE, an indication of a pairing of the base station and the UE, or an indication of a pairing between the first UE and the second UE.

30. The apparatus of claim 28, wherein the instructions are further executable by the processor to cause the apparatus to:

include, in the capability information message, an indication that the first reconfigurable intelligent surface is capable of transmitting and receiving at least one of data messages, control messages, or feedback messages via at least one of the first communication link or the second communication link, an indication that the first reconfigurable intelligent surface is capable of autonomously identifying resources on the second communication link, or a request for assistance in identifying resources on the second communication link.

* * * * *